US009535598B2

(12) United States Patent
Rimon et al.

(10) Patent No.: US 9,535,598 B2
(45) Date of Patent: Jan. 3, 2017

(54) HOVER AND TOUCH DETECTION FOR A DIGITIZER

(71) Applicant: Microsoft Technology Licensing, LLC, Redmond, WA (US)

(72) Inventors: Ori Rimon, Tel-Aviv (IL); Ariel Kerner, Herzlia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/753,092

(22) Filed: Jun. 29, 2015

(65) Prior Publication Data

US 2015/0301714 A1  Oct. 22, 2015

Related U.S. Application Data

(62) Division of application No. 11/822,950, filed on Jul. 11, 2007, now Pat. No. 9,069,417.

(Continued)

(51) Int. Cl.
G06F 3/041 (2006.01)
G06F 3/0488 (2013.01)
G06F 3/038 (2013.01)
G06F 3/044 (2006.01)
G06F 3/046 (2006.01)

(52) U.S. Cl.
CPC ............ G06F 3/0488 (2013.01); G06F 3/038 (2013.01); G06F 3/041 (2013.01); G06F 3/044 (2013.01); G06F 3/046 (2013.01); G06F 3/0416 (2013.01); G06F 3/0418 (2013.01); G06F 2203/04101 (2013.01); G06F 2203/04106 (2013.01); G06F 2203/04108 (2013.01); G06F 2203/04111 (2013.01)

(58) Field of Classification Search
None
See application file for complete search history.

(56) References Cited

U.S. PATENT DOCUMENTS 4,686,332 A   8/1987  Greanias et al.
4,707,845 A   11/1987 Krein et al.
(Continued)

FOREIGN PATENT DOCUMENTS

CN   1679078   10/2005
EP   0814423   12/1997
(Continued)

OTHER PUBLICATIONS

International Preliminary Report on Patentability Dated Jan. 13, 2009 From the International Bureau of WIPO Re.: Application No. PCT/IL2007/000870.
(Continued)

Primary Examiner — Joseph Haley
(74) Attorney, Agent, or Firm — Miia Kati Janette Sula; Sergey Lamansky; Micky Minhas

(57) ABSTRACT

A method and system for tracking a hover event on a digitizer sensor that treats hover and touch events differently comprises configuring at least one parameter of the digitizer sensor for hover tracking; wherein the at least one parameter is configured differently than for touch tracking, and detecting a pattern of input signals from a plurality of conductive lines on the digitizer sensor defining a tracking point responsive to the pattern of hover input signals detected.

21 Claims, 16 Drawing Sheets

Related U.S. Application Data

(60) Provisional application No. 60/834,562, filed on Aug. 1, 2006, provisional application No. 60/830,136, filed on Jul. 12, 2006.

(56) References Cited

U.S. PATENT DOCUMENTS

| | | | |
|---|---|---|---|
| 4,764,885 | A | 8/1988 | Greanias et al. |
| 5,825,352 | A | 10/1998 | Bisset et al. |
| 5,831,600 | A | 11/1998 | Inoue et al. |
| 5,841,078 | A | 11/1998 | Miller et al. |
| 5,854,881 | A | 12/1998 | Yoshida et al. |
| 6,075,520 | A | 6/2000 | Inoue et al. |
| 6,222,528 | B1 | 4/2001 | Gerpheide et al. |
| 6,297,811 | B1 | 10/2001 | Kent et al. |
| 6,498,602 | B1 | 12/2002 | Ogawa |
| 6,690,156 | B1 | 2/2004 | Weiner et al. |
| 6,778,686 | B1 | 8/2004 | Hestnes et al. |
| 6,781,577 | B2 | 8/2004 | Shigetaka |
| 6,930,672 | B1 | 8/2005 | Kuribayashi |
| 7,038,659 | B2 | 5/2006 | Rajkowski |
| 7,190,348 | B2 | 3/2007 | Kennedy et al. |
| 7,339,418 | B2 | 3/2008 | Regier |
| 7,561,146 | B1 * | 7/2009 | Hotelling ............... G06F 3/0304 345/168 |
| 7,683,888 | B1 | 3/2010 | Kennedy et al. |
| 7,701,447 | B2 | 4/2010 | Lii et al. |
| 7,847,789 | B2 | 12/2010 | Kolmykov-Zotov et al. |
| 7,868,874 | B2 | 1/2011 | Reynolds |
| 8,059,102 | B2 | 11/2011 | Rimon et al. |
| 2002/0015024 | A1 | 2/2002 | Westerman et al. |
| 2002/0163506 | A1 | 11/2002 | Matusis |
| 2003/0098858 | A1 | 5/2003 | Perski et al. |
| 2003/0133598 | A1 | 7/2003 | Recce |
| 2003/0179323 | A1 | 9/2003 | Abileah et al. |
| 2004/0012579 | A1 | 1/2004 | Nagasaka et al. |
| 2004/0021633 | A1 | 2/2004 | Rajkowski |
| 2004/0056245 | A1 | 3/2004 | Thomas et al. |
| 2004/0085300 | A1 | 5/2004 | Matusis |
| 2004/0095333 | A1 | 5/2004 | Morag et al. |
| 2004/0155871 | A1 | 8/2004 | Perski et al. |
| 2004/0174832 | A1 | 9/2004 | Geiger et al. |
| 2004/0178997 | A1 | 9/2004 | Gillespie et al. |
| 2005/0099398 | A1 | 5/2005 | Garside et al. |
| 2005/0226505 | A1 | 10/2005 | Wilson |
| 2006/0012580 | A1 | 1/2006 | Perski et al. |
| 2006/0012581 | A1 | 1/2006 | Haim et al. |
| 2006/0026521 | A1 | 2/2006 | Hotelling et al. |
| 2006/0026535 | A1 | 2/2006 | Hotelling et al. |
| 2006/0097991 | A1 | 5/2006 | Hotelling et al. |
| 2006/0109252 | A1 | 5/2006 | Kolmykov-Zotov et al. |
| 2006/0214926 | A1 | 9/2006 | Kolmykov-Zotov et al. |
| 2006/0244733 | A1 * | 11/2006 | Geaghan ............... G06F 3/041 345/173 |
| 2006/0267953 | A1 | 11/2006 | Peterson, Jr. et al. |
| 2006/0279548 | A1 | 12/2006 | Geaghan |
| 2007/0075968 | A1 | 4/2007 | Hall et al. |
| 2007/0097096 | A1 | 5/2007 | Rosenberg |
| 2007/0285404 | A1 | 12/2007 | Rimon et al. |
| 2008/0005703 | A1 | 1/2008 | Radivojevic et al. |
| 2008/0012835 | A1 | 1/2008 | Rimon et al. |
| 2008/0012838 | A1 | 1/2008 | Rimon |
| 2008/0218494 | A1 | 9/2008 | Perski et al. |

FOREIGN PATENT DOCUMENTS

| | | |
|---|---|---|
| EP | 1335318 | 8/2003 |
| EP | 1391807 | 2/2004 |
| GB | 1486988 | 9/1977 |
| JP | 63-008818 | 1/1988 |
| JP | 02-095005 | 4/1990 |
| JP | 07-230352 | 8/1995 |
| JP | 2000-020229 | 1/2000 |
| JP | 2002-082765 | 3/2002 |
| JP | 2002-342033 | 11/2002 |
| JP | 2005-031754 | 2/2005 |
| JP | 2005-031799 | 2/2005 |
| JP | 2005-149531 | 6/2005 |
| WO | WO 97/36225 | 10/1997 |
| WO | WO 03/005293 | 1/2003 |
| WO | WO 2004/051392 | 6/2004 |
| WO | WO 2005/114369 | 12/2005 |
| WO | WO 2007/144881 | 12/2007 |
| WO | WO 2008/007372 | 1/2008 |

OTHER PUBLICATIONS

Acknowledgement of Request Dated Oct. 13, 2011 Following Notice of Allowance of Aug. 26, 2011 From the US Patent and Trademark Office Re. U.S. Appl. No. 11/808,868.
Advisory Action Before the Filing of an Appeal Brief Dated Feb. 5, 2014 From the US Patent and Trademark Office Re. U.S. Appl. No. 11/822,950.
Advisory Action Before the Filing of an Appeal Brief Dated Jan. 5, 2015 From the US Patent and Trademark Office Re. U.S. Appl. No. 11/822,950.
Applicant-Initiated Interview Summary Dated Mar. 19, 2014 From the US Patent and Trademark Office Re. U.S. Appl. No. 11/822,950.
Corrected Notice of Allowability Dated Apr. 9, 2015 From the US Patent and Trademark Office Re. U.S. Appl. No. 11/822,950.
International Preliminary Report on Patentability Dated Jul. 9, 2008 From the International Preliminary Examining Authority Re.: Application No. PCT/IL2007/000712.
International Search Report and the Written Opinion Dated Jun. 3, 2008 From the International Searching Authority Re. Application No. PCT/IL2007/000870.
International Search Report Dated Sep. 27, 2007 From the International Searching Authority Re.: Application No. PCT/IL2007/000712.
Notice of Allowance Dated Oct. 13, 2013 From the US Patent and Trademark Office Re. U.S. Appl. No. 11/822,951.
Notice of Allowance Dated Aug. 26, 2011 From the US Patent and Trademark Office Re. U.S. Appl. No. 11/808,868.
Notice of Allowance Dated Feb. 27, 2015 From the US Patent and Trademark Office Re. U.S. Appl. No. 11/822,950.
Notice of Panel Decision From Pre-Appeal Brief Review Dated Jan. 9, 2013 From the US Patent and Trademark Office Re. U.S. Appl. No. 11/822,951.
Official Action Dated Apr. 2, 2013 From the US Patent and Trademark Office Re. U.S. Appl. No. 11/822,951.
Official Action Dated Jun. 4, 2012 From the US Patent and Trademark Office Re. U.S. Appl. No. 11/822,951.
Official Action Dated Oct. 5, 2010 From the US Patent and Trademark Office Re. U.S. Appl. No. 11/808,868.
Official Action Dated Mar. 6, 2012 From the US Patent and Trademark Office Re. U.S. Appl. No. 11/822,950.
Official Action Dated May 12, 2011 From the US Patent and Trademark Office Re. U.S. Appl. No. 11/822,950.
Official Action Dated Jun. 15, 2010 From the US Patent and Trademark Office Re. U.S. Appl. No. 11/808,868.
Official Action Dated Nov. 15, 2010 From the US Patent and Trademark Office Re. U.S. Appl. No. 11/822,951.
Official Action Dated Jan. 17, 2012 From the US Patent and Trademark Office Re. U.S. Appl. No. 11/822,951.
Official Action Dated Jun. 17, 2010 From the US Patent and Trademark Office Re. U.S. Appl. No. 11/822,951.
Official Action Dated May 17, 2011 From the US Patent and Trademark Office Re. U.S. Appl. No. 11/808,868.
Official Action Dated Nov. 17, 2014 From the US Patent and Trademark Office Re. U.S. Appl. No. 11/822,950.
Official Action Dated Oct. 17, 2011 From the US Patent and Trademark Office Re. U.S. Appl. No. 11/822,950.
Official Action Dated Sep. 19, 2012 From the US Patent and Trademark Office Re. U.S. Appl. No. 11/822,951.
Official Action Dated Nov. 20, 2013 From the US Patent and Trademark Office Re. U.S. Appl. No. 11/822,950.
Official Action Dated Jul. 23, 2013 From the US Patent and Trademark Office Re. U.S. Appl. No. 11/822,950.

(56) References Cited

OTHER PUBLICATIONS

Official Action Dated Apr. 25, 2014 From the US Patent and Trademark Office Re. U.S. Appl. No. 11/822,950.
Official Action Dated Jan. 28, 2011 From the US Patent and Trademark Office Re. U.S. Appl. No. 11/808,868.
Translation of Notice of Reason for Rejection Dated Mar. 2, 2012 From the Japanese Patent Office Re. Application No. 2009-519057.
Translation of Notice of Reason for Rejection Dated Jan. 6, 2012 From the Japanese Patent Office Re. Application No. 2009-514995.
Translation of Notice of Reason for Rejection Dated Nov. 9, 2012 From the Japanese Patent Office Re. Application No. 2009-519057.
Translation of Office Action Dated Dec. 3, 2014 From the State Intellectual Property Office of the People's Republic of China Re. Application No. 200880024068.
Translation of Office Action Dated Sep. 7, 2011 From the State Intellectual Property Office of the People's Republic of China Re. Application No. 200780030159.6.
Translation of Office Action Dated Jun. 9, 2011 From the State Intellectual Property Office of the People's Republic of China Re. Application No. 200780030159.6.
Translation of Office Action Dated Nov. 11, 2010 From the State Intellectual Property Office of the People's Republic of China Re. Application No. 200780030159.6.
Translation of Office Action Dated May 24, 2010 From the State Intellectual Property Office of the People's Republic of China Re. Application No. 200780030159.6.
Written Opinion Dated Sep. 27, 2007 From the International Searching Authority Re.: Application No. PCT/IL2007/000712.
Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

* cited by examiner

HOVER AND TOUCH DETECTION FOR A DIGITIZER

RELATED APPLICATIONS

This application is a division of U.S. patent application Ser. No. 11/822,950 filed on Jul. 11, 2007, which claims the benefit of priority under section 35 U.S.C. §119(e) of U.S. Provisional Application No. 60/830,136 filed on July 12, 2006 and U.S. Provisional Application No. 60/834,562 filed on Aug. 1, 2006 both of which are hereby incorporated by reference. The contents of the above applications are all incorporated by reference as if fully set forth herein in their entirety.

FIELD OF THE INVENTION

The present invention relates to a digitizer, and more particularly to fingertip touch sensitive digitizers.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless flat panel displays (FPD). Some of these devices are not connected to standard keyboards, mice or like input devices, which are deemed to limit their mobility. Instead there is a tendency to use touch input technologies of one kind or another. A stylus and/or finger may be used as a user interaction.

U.S. Pat. No. 6,690,156 entitled "Physical Object Location Apparatus and Method and a Platform using the same" and US Patent Publication No. 20040095333 entitled "Transparent Digitizer" both of which are assigned to N-trig Ltd., the contents of both which are incorporated herein by reference, describe an electro-magnetic method for locating physical objects on a FPD and a transparent digitizer that can be incorporated into an electronic device, typically over the active display screen. The digitizer sensor includes a matrix of vertical and horizontal conducting lines to sense an electric signal. Positioning the physical object at a specific location on the digitizer provokes a signal whose position of origin may be detected.

U.S. Patent Application Publication No. 20040155871 entitled "Touch Detection for a Digitizer" assigned to N-trig Ltd, which is incorporated herein by reference, describes a digitizing tablet system capable of detecting position of physical objects and/or fingertip touch using the same sensing conductive lines. Typically, the system includes a transparent sensor overlaid on a FPD. The digitizer's sensor includes a matrix of vertical and horizontal conducting lines to sense an electric signal. Touching the digitizer in a specific location provokes a signal whose position of origin may be detected.

U.S. Patent Application Publication No. 20060012580, entitled "Automatic switching for a dual mode digitizer" assigned to N-Trig, which is incorporated herein by reference, describes a method utilizing different types of user interactions, e.g. electromagnetic stylus and touch, in a digitizer system. A method for palm rejection based on the size of the detected area of the touch is described.

U.S. Patent Application Publication No. 20060097991, entitled "Multipoint TouchScreen" assigned to Apple Computers, the contents of which is incorporated herein by reference, describes a touch panel having a transparent capacitive sensing medium configured to detect multiple touches or near touches that occur at the same time and at distinct locations in the plane of the touch panel and to produce distinct signals representative of the location of the touches on the plane of the touch panel for each of the multiple touches.

SUMMARY OF THE INVENTION

An aspect of some embodiments of the invention is the provision of a digitizer system and a method for distinguishing between touch input signals and hover input signals to a digitizer. Touch and hover input signals can be obtained from a finger, palm, stylus, and/or object-type user interaction. According to some embodiments of the present invention, detected and/or recognized hover input signals can be implemented for user input e.g. for controlling cursor position, for predicting the oncoming of a finger touch event, and for distinguishing between touch intended for user interaction and touch not intended for user interaction.

According to some embodiments of the present invention, touch input signals and hover input signals to a digitizer are distinguished based on amplitude and gradient patterns of the detected input signals on the digitizer, for example, on one or more conductive lines of the digitizer. In some exemplary embodiments, a threshold on the amplitude of the received input signal is implemented to distinguish between hover and touch input signals and/or events. For example, a received input signal above a pre-defined amplitude threshold is determined to be derived from a touch event while a received input signal below a pre-defined amplitude threshold, but above a lower threshold is determined to be derived from a hover event. Even lower signals are optionally ignored. In some exemplary embodiments pre-defined gradient patterns corresponding to hover and touch events are implemented to distinguish between hover and touch. In some exemplary embodiments, thresholds on the gradient signal around the contour of the detected input signals may be implemented to distinguish between hover and touch. In some exemplary embodiments, input signals having a gradient value above a pre-defined gradient threshold is determined to be derived from a touch event while input signals having a gradient value below a pre-defined gradient threshold is determined to be derived from a hover event, if the signal is above a threshold. In some exemplary embodiments a combination of methods are implemented to distinguish between hover and touch.

An aspect of some embodiments of the invention is the provision of a system and method for tracking hover signals. According to some embodiments of the present invention, a digitizer system includes pre-defined parameters and/or settings dedicated for tracking hover input signals. In some exemplary embodiments, the digitizer system includes a pre-defined gain setting specific and/or dedicated for tracking hover events. The pre-defined gain setting implemented for hover tracking is typically higher than what is used for touch tracking. In some exemplary embodiments, the digitizer system includes a pre-defined power setting for an interrogating AC signal transmitted over the conductive lines of the digitizer. The pre-defined power setting implemented for hover tracking is typically higher than power used for tracking touch events. In some exemplary embodiments, when implementing junction capacitive methods, the digitizer system is pre-set during hover detection to transmit an interrogating AC signal on pairs of parallel lines of the digitizer grid coupled to a differential amplifier. In some exemplary embodiments, the digitizer system and method includes a pre-defined time window for processing hover events separate from that used for touch detection.

According to some embodiments of the present invention, a hovering event is applied to control cursor position on a display screen associated with the digitizer. In one exemplary embodiment, the center of mass of the detected hover object is implemented as the tracking point for controlling cursor position. In some embodiments the position of the hover event is used to trigger an emphasis of a feature on the display screen, such as an icon or a "touch-button".

According to some embodiments of the present invention, when detecting a hover event, the distance above which a user interaction is hovering over the digitizer is estimated. In some exemplary embodiments, the height above which a user interaction is hovering over the digitizer is estimated based on amplitude of the input signals received. In some exemplary embodiments, input signals received above a pre-defined height (for example, very low signals) are rejected for user interaction input. According to some exemplary embodiments, a 3D surface image of an input signal can be determined. For example, a distance above which a user interaction is hovering over the digitizer is estimated for each junction of cross conductive lines from which an input signal was detected.

An aspect of some embodiments of the invention is the provision of a system and method for switching between a hover detection configuration and touch detection configuration. According to some embodiments of the present invention, both hover and touch is used for user interaction to operate the digitizer system. In some exemplary embodiments, while a hovering event is applied to control cursor position on a display screen associated with the digitizer, a touch event is applied for selection, e.g. a left click in a mouse, writing text, and entering data.

According to some embodiments of the present invention, the digitizer sensor and/or system parameters and/or settings are adjusted, e.g. adjusted automatically, to correspond to a detected event, e.g. hover and/or touch. For example, in response to a detected hover and/or touch event, gain settings of the digitizer sensor are adjusted so that the location of the event may be more accurately determined. It is noted that if the signal and/or gain is high, a touch event may saturate the amplifiers or A/D of the system. On the other hand if the signal and/or gain is low, then for a hover event, the signal to noise ratio may be too low for accurate determination of position.

According to some embodiments of the present invention, the digitizer sensor is initially and/or as a default configured for hover detection. According to some exemplary embodiments, detection of saturated received input provides indication that a touch event has been detected and in response to that detection, the digitizer systems settings are adjusted to process touch events. According to some exemplary embodiments of the present invention, in response to "null" in the input reading and/or a low amplitude signal, the digitizer system settings are adjusted, e.g. readjusted, to detect hovering. Once a hover event is detected, the system tracks the position of the hovered object. In some exemplary embodiments a gesture performed by the user is implemented to switch between hover and touch configuration.

According to some embodiments of the present invention one or more system settings are adjusted to accommodate a switch between hover and touch detection. For example, a gain setting for reading input signals from the conductive lines are adjusted, a power setting for an AC signal transmitted over the conductive lines of the digitizer is adjusted, and/or a time window for detecting input signals is adjusted.

An aspect of some embodiments of the invention is the provision of a digitizer system and methods for simultaneous detection of hover and touch events. According to some embodiments of the present invention, simultaneous detection is facilitated by initially implementing a digitizer sensor setting for hover detection and then adjusting the sensor parameters associated with specific conductive lines or areas of the digitizer where saturation is detected for hover detection. Adjusting system parameters associated with specific conductive lines may include for example, adjusting the gain for those lines, and/or adjusting the amplitude of the AC signal imposed on those specific lines (e.g. used to interrogate specific lines) or on lines coupled to them by touch or hover. Alternatively, simultaneous detection is facilitated by implementing system setting for hover detection on some of the conductive lines, e.g. every other conductive line, every 3 conductive line, etc., and implementing system setting for touch detection on the other the conductive lines. Upon detection of a hover and/or touch event, sensor settings for conductive lines in the vicinity may be updated to track the position of the detected event.

An aspect of some embodiments of the invention is the provision of a digitizer system and methods for palm recognition and optional rejection. According to some embodiments of the present invention, input signals derived from palm touch are not intended for user interaction and are rejected.

According to some embodiments of the present invention palm and finger touch are distinguished based on a detected combination pattern of hover signals are related touch signals. In some exemplary embodiments, palm and finger touch are distinguished based on the size of the hover event and the size of the related touch event. In some exemplary embodiments of the size of the event is estimated by the number of conductive lines over which an input signal has been detected. In some exemplary embodiments, palm and fingertip touch are distinguished based on the relative position of the detected hover and touch event. In some exemplary embodiments, palm and fingertip touch are distinguished based on both the size and the relative position of the hover and associated touch event. In some exemplary embodiments, palm and fingertip touch are distinguished based on the relative position of the detected touch event and a concurrently surrounding hover event.

An aspect of some embodiments of the present invention provides for a method for tracking a hover event on a digitizer sensor that treats hover and touch events differently, the method comprising configuring at least one parameter of the digitizer sensor for hover tracking, wherein the at least one parameter is configured differently than for touch tracking, detecting a pattern of input signals from a plurality of conductive lines on the digitizer sensor, and defining a tracking point responsive to the pattern of hover input signals detected.

Optionally, the at least one parameter includes a gain factor of amplifiers coupled to the plurality of conductive lines.

Optionally, the at least one parameter includes an amplitude of a signal implemented to interrogate the plurality of conductive lines.

Optionally, the configuring the at least one parameters of the digitizer sensor for hover tracking includes interrogating pairs of conducting lines coupled a differential amplifier with an AC signal to detect the pattern of input signals.

Optionally, the detecting is based on a capacitive touch method.

Optionally, the pattern is a pattern of amplitudes of the input signals.

Optionally, the tracking point is a center of mass of the pattern of the amplitudes of the input signals.

Optionally, the center of mass is defined as a weighted average of the pattern of the amplitudes of the input signals.

Optionally, the method comprises calculating a height of the hover event from the pattern of the amplitudes of the input signals.

Optionally, the method comprises calculating a change in height of the hover event from the pattern of the amplitudes of the input signals.

Optionally, the change in height is based on changes in the amplitude of the input signals over time.

Optionally, the method comprises calculating a surface map of heights of the pattern of the amplitudes of the input signals.

Optionally, the method comprises controlling cursor position of a display associated with the digitizer sensor with the tracking point.

Optionally, the method comprises determining amplitudes of the input signals and switching the configuration of the at least one parameter of the digitizer sensor for touch tracking responsive to a pre-defined number of the input signals having amplitudes above a pre-defined amplitude threshold.

Optionally, the pre-defined amplitude threshold is a level of saturation of the digitizer sensor.

Optionally, the method comprises detecting a low signal event while the at least one parameter is configured for the touch tracking; and switching the configuration of the at least one parameter for hover tracking responsive to detection of the low signal event, wherein the low signal event is defined between an upper and a lower threshold.

Optionally the method comprises detecting input signals from a plurality of conductive lines of the digitizer sensor, determining a pattern of amplitude gradients of the input signals, and determining either a touch or hover event in a region corresponding to the plurality of conductive lines responsive to the pattern of the amplitude gradients.

Optionally, the method comprises determining a contour of a region on the digitizer sensor from which the input signals are detected, determining gradients of signal amplitudes of the input signals in the vicinity of the contour, and defining a gradient threshold above which the input signals are determined to be touch input signals and below which the input signals are determined to be hover input signals.

Optionally, the method comprises switching configuration of the at least one parameter for touch tracking responsive to at least one of the gradients being above the gradient threshold.

Optionally, the method comprises switching configuration of the at least one parameter back to a configuration for hover tracking responsive to at least one of the gradients being below the gradient threshold.

An aspect of some embodiments of the present invention provides a method for simultaneously tracking hover and touch events on a digitizer sensor, the method comprising configuring part of a digitizer sensor for hover tracking, configuring part of a digitizer sensor for touch tracking, and tracking the part of the digitizer sensor configured for the hover tracking and the part of the digitizer sensor configured for the touch tracking substantially simultaneously.

Optionally, the method comprises detecting a touch event on one or more conductive lines of the digitizer sensor and configuring the one or more conductive lines for touch tracking.

Optionally, detecting the touch event comprises comparing amplitudes of input signals detected on the one or more conductive lines to a pre-defined amplitude threshold; and verifying the touch event responsive to a pre-defined number of the input signals having amplitudes above the pre-defined amplitude threshold.

Optionally the amplitude threshold is a saturation level of the digitizer sensor.

Optionally, the method comprises detecting input signals from a plurality of conductive lines of the digitizer sensor, determining a pattern of amplitude gradients of the input signals, and determining either a touch or hover event in a region corresponding to the plurality of conductive lines responsive to the pattern of the amplitude gradients.

Optionally, the method comprises determining a contour of a region on the digitizer sensor from which input signals are detected, determining amplitude gradients of the input signals detected in the vicinity of the contour, and defining a gradient threshold above which the input signals from the region are determined to be a touch input signal and below which the input signal from the region are determined to a hover input signal.

Optionally, the method comprises switching configuration of part of the digitizer sensor from touch tracking to hover tracking responsive to detection of a low signal event.

Optionally, the method comprises switching configuration of part of the digitizer sensor to a hover configuration responsive to determination that an input signal to the digitizer sensor is below a pre-defined gradient threshold.

Optionally, the method comprises determining at least one parameter value of a hover event tracked on the part of the digitizer sensor for hover tracking, and verifying a touch event as a user intended user interaction responsive to the at least one parameter value.

Optionally, the method comprises determining at least one parameter value of a hover event tracked on the part of the digitizer sensor for hover tracking, and rejecting a touch event as a user intended user interaction responsive to the at least one parameter value.

Optionally, the method comprises detecting a pre-defined gesture, wherein the pre-defined gesture includes a touch and hover gesture performed substantially simultaneously.

An aspect of some embodiments of the present invention provides a method for distinguishing between touch input signals and hover input signals detected on a digitizer sensor, the method comprising detecting input signals from a digitizer sensor determining amplitudes of the input signals and gradients of the amplitudes, and distinguishing between touch input signals and hover input signals based on the amplitudes and the gradients.

Optionally, the method comprises determining a contour of a region on the digitizer sensor from which the input signals are detected, and determining the gradients in the vicinity of the contour.

Optionally, the input signals are detected from a plurality of vertical and horizontal conductive lines of the digitizer sensor arranged in a grid like fashion, and wherein the contour is a rectangular contour defined by the plurality vertical and horizontal conductive lines detecting the input signals.

Optionally, the input signals are detected from a plurality of vertical and horizontal conductive lines of the digitizer sensor arranged in a grid like fashion, and wherein the contour is defined by junctions of cross conducting lines of the digitizer sensor from which the inputs signals are detected.

Optionally, the method comprises defining a gradient threshold for the gradients above which the input signals are determined to be touch input signals and below which the input signals are determined to hover input signals.

Optionally, the method comprises controlling cursor position on a display associated with the digitizer based on the hover input signals.

Optionally, the method comprises defining a tracking point in a region from which the hover input signals are detected.

Optionally, the tracking point is a center of the shape of the region.

Optionally, the tracking point is a center of mass of the region.

Optionally, the center of mass is defined as a weighted average of the amplitudes.

Optionally, the method comprises performing a user action based on the touch input signals, wherein the user action is selected from a group consisting of selecting a feature, writing text, monitoring a cursor, and entering data with the touch input signal.

Optionally, the method comprises verifying that the touch input signals are user intended input signals based on features of the hover input signals.

Optionally, the method comprises characterizing the touch input signals as a user intended input signals based on the hover input signals.

Optionally, the input signals are detected by a capacitive touch method.

Optionally, the digitizer is a transparent digitizer.

An aspect of some embodiments of the present invention provides a method for palm rejection for a digitizer sensor, the method comprising detecting a hover event and a related touch event, and verifying or rejecting the related touch event as an intended user interaction based on the detected hover event and the related touch event.

Optionally, the method comprises determining an area of the hover event and the related touch event, and verifying or rejecting the related touch event as an intended user interaction based on the area of the detected hover event.

Optionally, the method comprises rejecting the related touch event as an intended user interaction responsive to the area of the related touch event being larger than a pre-defined touch threshold.

Optionally, the method comprises characterizing the related touch event as an intended user interaction responsive to the area of the hover event being smaller than a pre-defined hover threshold.

Optionally, the method comprises determining a center of mass of the hover event and of the related touch event.

Optionally, the method comprises verifying the related touch event as an intended user interaction responsive to a distance in the center of mass between the hover and related touch event above a pre-determined shift threshold.

Optionally, the hover event is a precursor to the related touch event.

Optionally, the related touch event and the hover event are detected substantially simultaneously.

Optionally, the method comprises verifying the related touch event as an intended user interaction responsive to determining that the area of the hover event appears on one side of the area of the related touch event.

Optionally, the method comprises rejecting the related touch event as an intended user interaction responsive to the area of the hover event substantially surrounding the area of the related touch event, wherein the area of the hover event is larger than a pre-defined area.

Optionally, the method comprises verifying the touch event as an intended user interaction responsive to the area of the hover event substantially surrounding the area of the related touch event, wherein the area of the hover event is smaller than a pre-defined area.

An aspect of some embodiments of the present invention provides a system for tracking hover and touch on a digitizer comprising a digitizer operative to detect hover and touch input signals, a memory operative to store a pre-defined digitizer configuration for touch and a pre-defined digitizer configuration for hover, and a controller operative to apply the pre-defined digitizer configuration for touch to track touch input signals and the pre-defined digitizer configuration for hover to track hover input signals.

Optionally, the controller is operative to distinguish between hover and touch input signals to the digitizer sensor.

Optionally, the pre-defined digitizer configuration includes dedicated pre-defined gain settings for touch and hover tracking.

Optionally, the pre-defined digitizer configuration includes dedicated pre-defined power levels for touch and hover tracking interrogating signals.

Optionally, the digitizer comprises a plurality of conductive lines and wherein the controller is operative to apply the pre-defined digitizer configuration for touch on conducting lines from which touch input signals are detected and to apply the pre-defined digitizer configuration for hover on conducting lines from which hover input signals are detected.

Optionally, the controller operative to switch from the pre-defined configuration for hover to the pre-defined configuration for touch when touch input signals are detected.

Optionally, the controller is operative to switch from the pre-defined configuration for touch to the pre-defined configuration for hover when a low amplitude signal is detected.

Optionally, the controller is operative to recognize a gesture to switch between hover tracking and touch tracking.

BRIEF DESCRIPTION OF THE SEVERAL VIEWS OF THE DRAWING(S)

The subject matter regarded is particularly and distinctly claimed in the concluding portion of the specification. Non-limiting examples of embodiments of the present invention are described below with reference to figures attached hereto, which are listed following this paragraph. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. For example, the dimensions of some of the elements may be exaggerated relative to other elements for clarity.

Figure 1:
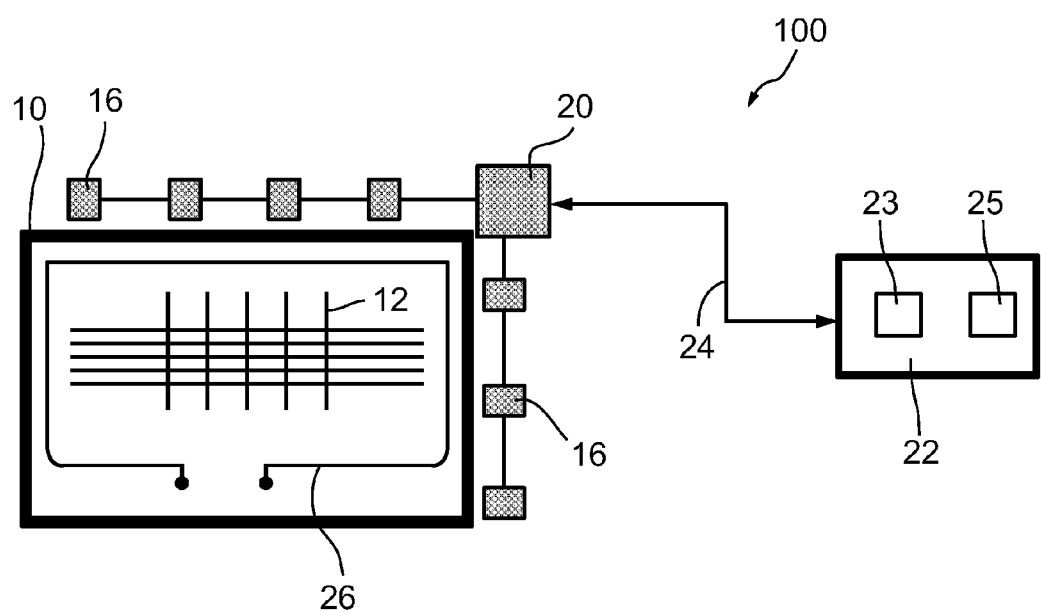
FIG. 1 is an exemplary simplified block diagram of a digitizer system in accordance with some embodiments of the present invention.

It will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION OF EXEMPLARY EMBODIMENTS

In the following description, exemplary, non-limiting embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Reference is now made to FIG. 1 showing an exemplary simplified block diagram of a digitizer system in accordance with some embodiments of the present invention. The digitizer system 100 shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system comprises a grid-based sensor 12, which is optionally transparent, and which is typically overlaid on FPD 10.

An ASIC 16 comprises circuitry to process and sample the sensor's output into a digital representation. The digital output signal is forwarded to digital unit 20, e.g. digital ASIC unit, for further digital processing. According to some embodiments of the present invention, digital unit 20 together with ASICs 16 serve as the controller of the digitizer system and/or have functionality of a controller and/or processor. The outcome, once determined, is forwarded to host 22 via interface 24 for processing by the operating system or any current application. According to some embodiments of the present invention, control functionality is additionally or exclusively included in the host 22. ASIC 16 and digital unit 20 may be provided as a single ASIC. According to some embodiments of the present invention, digital unit 20 together with ASICs 16 include memory and/or memory capability. In some exemplary embodiments, the memory is implemented to store predefined digitizer configuration for touch and/or hover detection.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent. Typically, the grid is made of two layers, which are electrically separated from each other. Typically, one of the layers contains a set of equally spaced parallel conductors and the other layer contains a set of equally spaced parallel conductors orthogonal to the set of the first layer. Typically, the parallel conductors are equally spaced straight lines, and are input to amplifiers included in ASIC 16. Optionally the amplifiers are differential amplifiers. Typically, the parallel conductors are spaced at a distance of approximately 2-8 mm, e.g. 4 mm, optionally depending on the size of the FPD and a desired resolution. Optionally the region between the grid lines is filled with a non-conducting material having optical characteristics similar to the conducting lines, to mask the presence of the conducting lines.

Typically, ASIC 16 is connected to outputs of the various conductors in the grid and functions to process the received signals at a first processing stage. As indicated above, ASIC 16 typically includes an array of amplifiers, e.g. differential amplifiers, to amplify the sensor's signals. Additionally, ASIC 16 optionally includes one or more filters to remove irrelevant frequencies. Optionally, filtering is performed prior to sampling. The signal is then sampled by an A/D, optionally filtered by a digital filter and forwarded to digital ASIC unit, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as stylus, and/or finger, touching the digitizer sensor. According to some embodiments of the present invention hovering of an object, e.g. stylus, finger and hand, is also detected and processed by digital unit 20. Calculated position is sent to the host computer via interface 24.

According to some embodiments, digital unit 20 produces and manages a triggering pulse to be provided to an excitation coil 26 that surrounds the sensor arrangement and the display screen. The excitation coil provides a trigger pulse (in the form of an electric or electromagnetic field) that excites passive circuitry in the stylus to produce a response from the stylus that can subsequently be detected.

According to some embodiments, digital unit 20 produces and sends a triggering pulse to at least one of the conductive lines.

According to some embodiments of the invention, host 22 includes at least a memory unit 23 and a processing unit 25 to store and process information obtained from digitizer 16. Memory and processing capability is also generally included in digital unit 20 and ASIC 16. According to some embodiments of the present invention memory and processing functionality may be divided between any two or three of host 22, digitizer unit 20, and ASIC 16 or may reside in only one of them.

Stylus Detection

According to some embodiments of the present invention, the stylus is a passive element. Optionally, the stylus comprises a resonant circuit, which is triggered by excitation coil 26 to oscillate at its resonant frequency. At the resonant frequency, the circuit produces oscillations that continue after the end of the excitation pulse and steadily decay. While the stylus touches and/or hovers over digitizer 20, the decaying oscillations induce a voltage in nearby conductive lines which are sensed by the sensor 12. Alternatively, the stylus may include an energy pick-up unit and an oscillator circuit.

According to some embodiments of the present invention, two parallel sensor lines that are close but not adjacent to one another are connected to the positive and negative input of a differential amplifier respectively. The amplifier is thus able to generate an output signal which is an amplification of the difference between the two sensor line signals. An amplifier having a stylus on one of its two sensor lines will produce a relatively high amplitude output. Stylus detection is described with further details, for example in incorporated US Patent Application Publication 20040095333.

Finger Touch Detection

Figure 2:
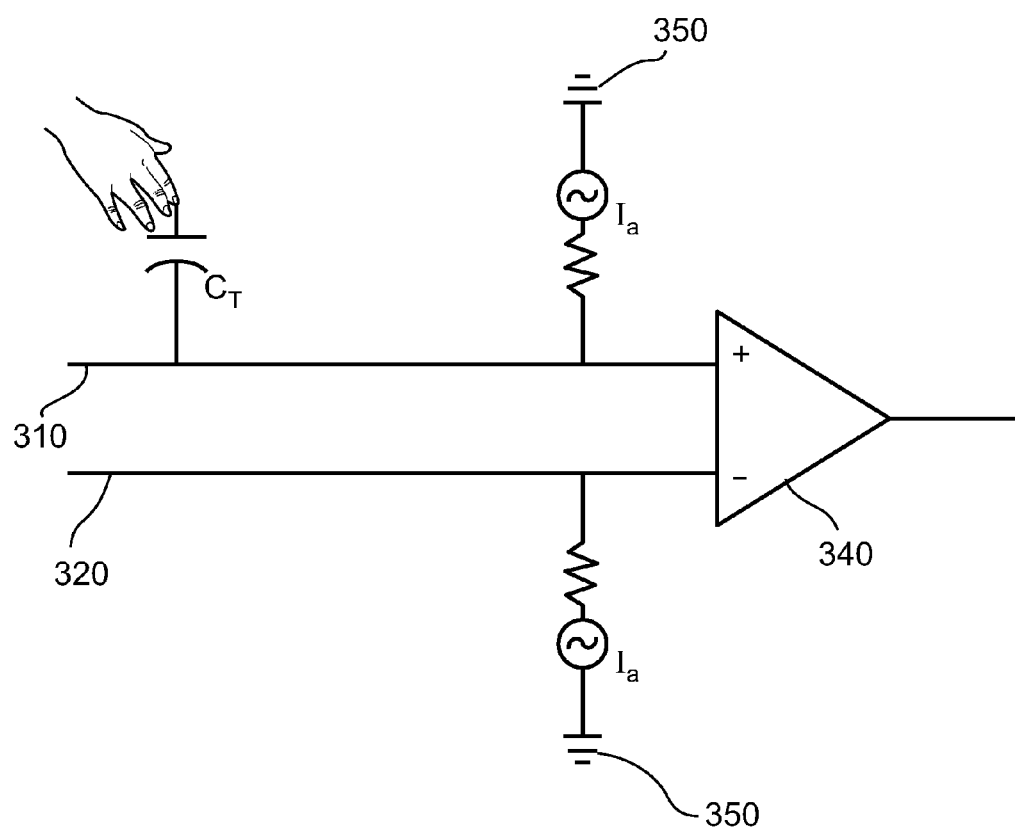
FIG. 2 is an exemplary simplified circuit diagram for touch detection based on a capacitive touch method according to some embodiments of the present invention.

Reference is now made to FIG. 2 showing an exemplary circuit diagram for touch detection according to some embodiments of the present invention. Conductive lines 310 and 320 are parallel non-adjacent lines of sensor 12. According to some embodiments of the present invention, conductive lines 310 and 320 are interrogated to determine if there is a finger input signal derived from finger touch and/or finger hovering. To query the pair of conductive lines, a signal source $I_a$, e.g. an AC signal source induces an oscillating signal in the pair. Signals are referenced to a common ground 350. When a finger is placed on one of the conductive lines of the pair, a capacitance, $C_T$, develops between the finger (either touching or hovering over the digitizer) and conductive line 310. As there is a potential between the conductive line 310 and the user's finger, current passes from the conductive line 310 through the finger to ground. Consequently a potential difference is created between conductive line 310 and its pair 320, both of which serve as input to differential amplifier 340. Finger touch detection is described with further details in, for example incorporated US Patent Application Publication 20040155871. Typically parasitic capacitance develops between the display screen and the conductive lines of the overlaying digitizer sensor. Typically parasitic capacitance induces a current leakage into the conductive lines of the digitizer referred to as a "steady noise" and/or steady state noise. In an ideal environment, the parasitic capacitance and therefore the steady state noise level in each of the lines are expected to be identical. However, in practice slight differences in distance between the digitizer and screen, material structure in specific areas of the digitizer screen, environmental conditions and parasitic capacitance on associated PCB, may affect the parasitic capacitance level between the screen and some of the lines. The unbalanced capacitance creates an unbalance steady state noise level of the lines. A system and method for balancing capacitance is described in U.S. patent application Ser. No. 11/798,894, entitled "Variable Capacitor Array" which is assigned to the common assignee and incorporated herein by reference. The systems and methods described in U.S. patent application Ser. No. 11/798,894 may be applied to the present invention.

Figure 3:
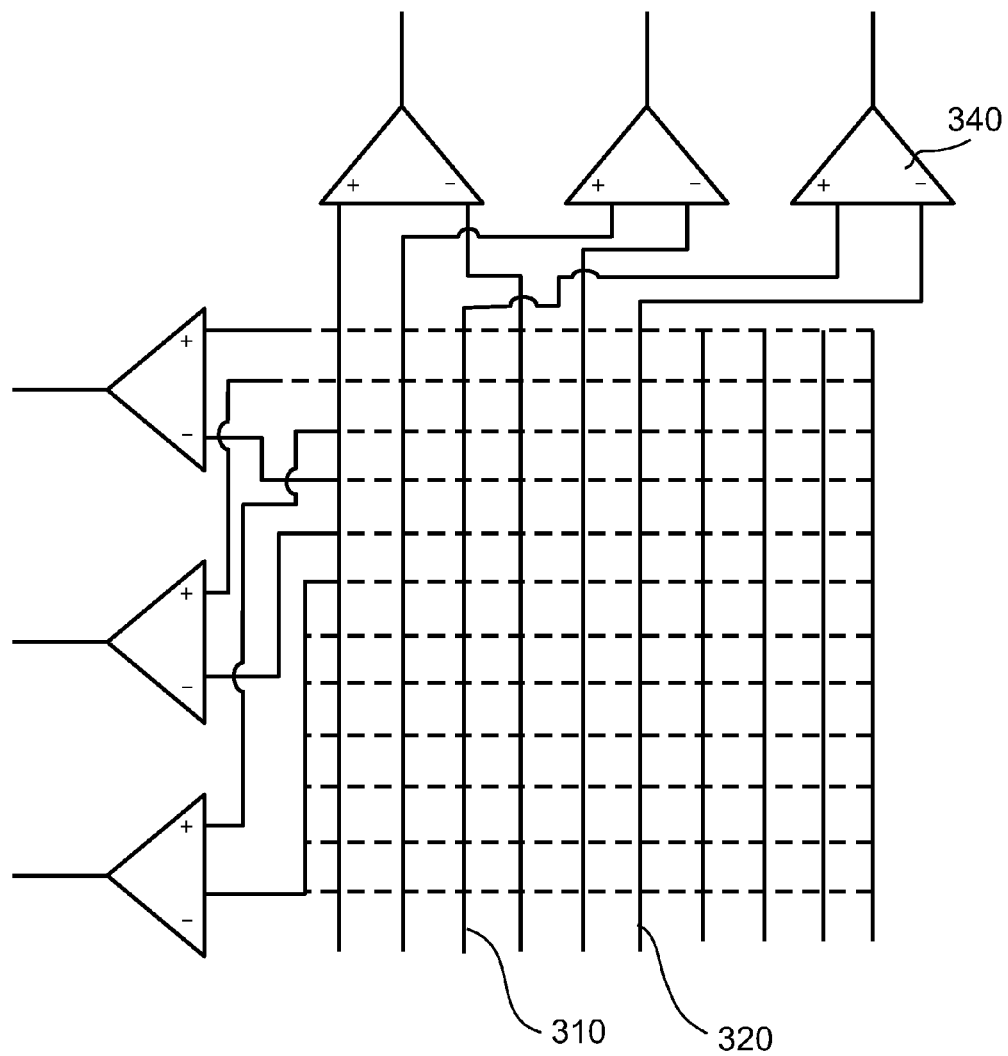
FIG. 3 is an exemplary simplified circuit diagram of a digitizer sensor including differential amplifiers according to some embodiments of the present invention.

Reference is now made to FIG. 3 showing an array of conductive lines of the digitizer sensor as input to differential amplifiers according to embodiments of the present invention. Separation between the two conductors 310 and 320 is typically greater than the width of the finger so that the necessary potential difference can be formed, e.g. approximately 12 mm. Typically a finger touch on the sensor may span 2-8 lines, e.g. 6 conductive lines. Typically, the finger hovers over and/or touches the digitizer over a number of conductive lines so as to generate an output signal in more than one differential amplifier, e.g. a plurality of differential amplifier's. However, a finger touch may be detected when placed over one conductive line. Typically a finger and/or hand hovering at a height of about 1 cm-4 cm above the digitizer can be detected, e.g. 1 cm-2 cm or 3 cm-4 cm. The differential amplifier 340 amplifies the potential difference developed between conductive lines 310 and 320. ASIC 16 and digital unit 20 process the amplified signal and determine the location and/or position of the user's finger based on the amplitude and/or signal level of the sensed signal.

In one example, the origin of the user's finger from the two inputs of the differential amplifier is determined by examining the phase of the output. In another example, since a finger touch typically produces output in more than one conductive line, the origin of the user's finger from the two inputs of the differential amplifier is determined by examining outputs of neighboring amplifiers and optionally interpolating is used to find a more accurate value. In yet other examples, a combination of both methods may be implemented.

Figure 4:
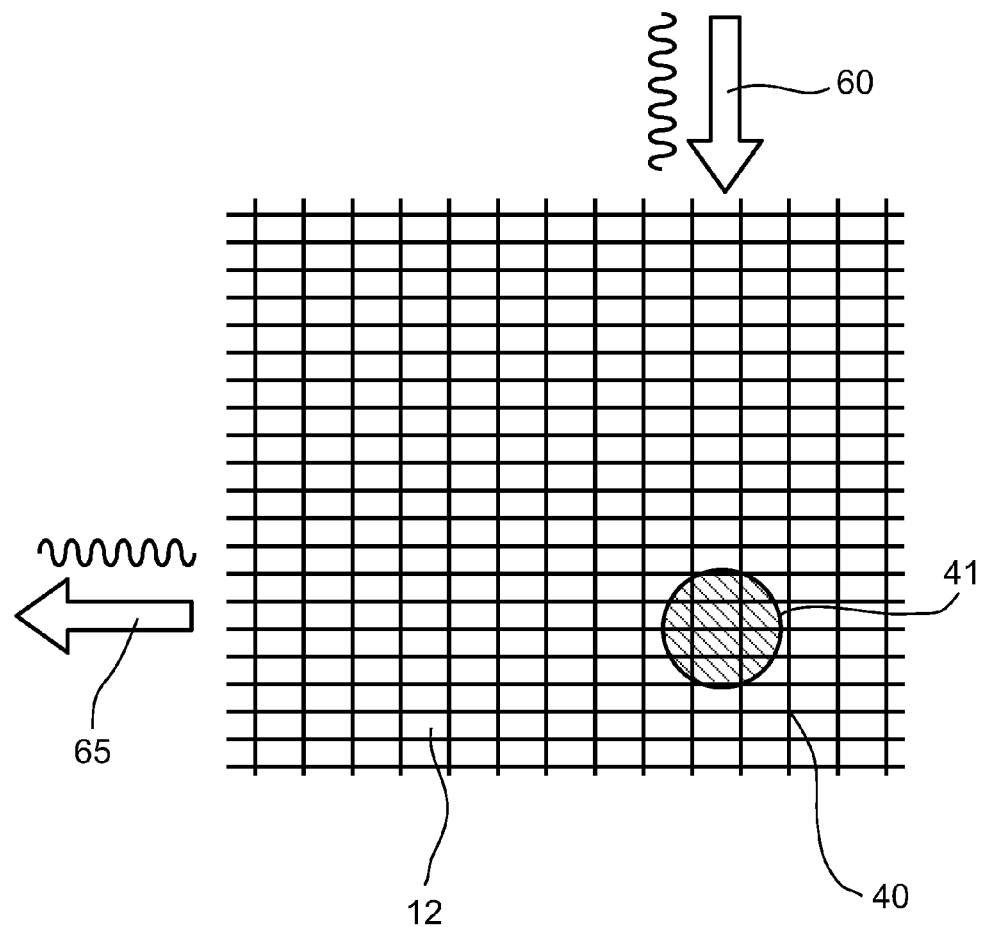
FIG. 4 is a schematic illustration of a digitizer sensor for finger touch detection based on a junction capacitive touch method, according to some embodiments of the present invention.

Reference is now made to FIG. 4 which schematically illustrates a capacitive junction touch method for finger touch detection using a digitizer sensor, according to some embodiments of the present invention. At each junction, e.g. junction 40 in sensor 12 a minimal amount of capacitance exists between orthogonal conductive lines. In an exemplary embodiment, an AC signal 60 is applied to one or more parallel conductive lines in the two-dimensional sensor matrix 12. When a finger 41 touches or hovers over the sensor at a certain position where signal 60 is induced, the capacitance between the conductive line through which signal 60 is applied and the corresponding orthogonal conductive lines at least proximal to the touch and/or hover position increases and signal 60 is coupled, by the capacitance of finger 41, to corresponding orthogonal conductive lines to produce and an output signal 65. This method is able to detect more than one finger touch and/or hover at the same time (multi-touch). This method further enables calculating touch and/or hover area. In exemplary embodiments of the present invention, each conductive line is input to an amplifier. Optionally, one line is input to a differential amplifier, while the other input to the amplifier is ground. Optionally, both lines of the pair are input to the differential amplifier and a same interrogating signal is transmitted over both lines of the pair. Typically, the presence of a finger touch decreases the coupled signal by 20-30% since the capacitive coupling caused by the finger typically drains current from the lines. The presence of a finger hovering may decrease the couple signal less drastically.

According to some embodiments of the present invention, a finger and/or hand 41 placed in proximity over the digitizer sensor at a height (h), forms a capacitance between the finger and/or hand and sensor 12 through the air, provided that the finger and/or hand is close to the sensor, i.e., for small heights. The presence of the finger and/or hand increases the capacitance between a conductive and the orthogonal conductive line which is at or close to the finger and/or hand position. As the signal is AC, the signal crosses at a junction by virtue of the capacitance of the finger and/or hand from the conductive line to the corresponding orthogonal conductive line forming the junction, and an output signal 65 is detected. According to some exemplary embodiments, the digitizer system can simultaneously detect and track a plurality of hovering objects.

It will be appreciated that depending on the size of the finger/hand and the fineness of the mesh of conductors, a plurality of the orthogonal conductors may receive some capacitive signal transfer, and interpolation of the signal between the conductors can be used to increase measurement accuracy.

The present invention is not limited to the technical description of the digitizer system described herein. Digitizer systems used to detect stylus and/or finger touch location may be, for example, similar to digitizer systems described in incorporated U.S. Pat. No. 6,690,156, U.S. Patent Application Publication No. 20040095333 and/or U.S. Patent Application Publication No. 20040155871. It will also be applicable to other digitized sensor and touch screens known in the art, depending on their construction.

According to some embodiments of the present invention, a system and methods for distinguishing between hover events and touch events is provided. Although the signal amplitude output of a hovered object is typically smaller than the signal amplitude output of a touching object, the determination that an object is hovering or touching cannot be based solely on the amplitude of the detected signal due to a wide variation between different users. Typically the amplitude of a detected touch input signal is a function of both finger size and pressure applied, both of which vary widely between users. External parameters of the sensor may also affect the amplitude of the detected signal making the distinction more difficult. However, for systems providing user specified detection, signal amplitude alone can be analyzed to distinguish between all hover and touch events.

Figure 5A:
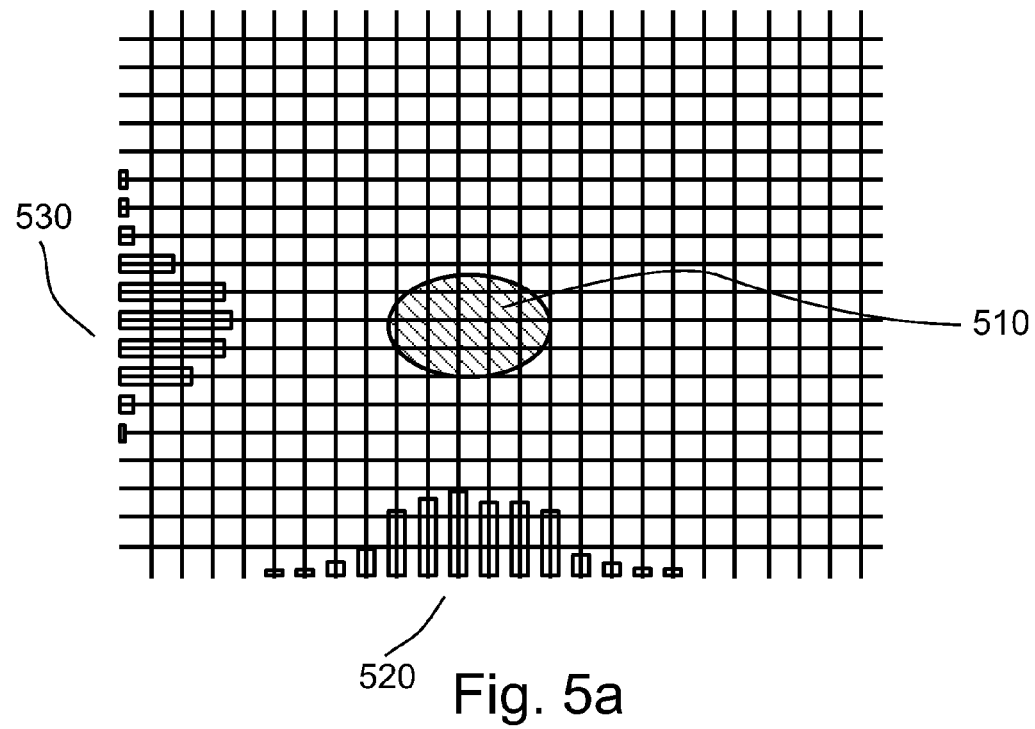
FIG. 5A is a schematic illustration of exemplary patterns of signal amplitudes obtained from touch input signals according to some embodiments of the present invention.
Figure 5B:
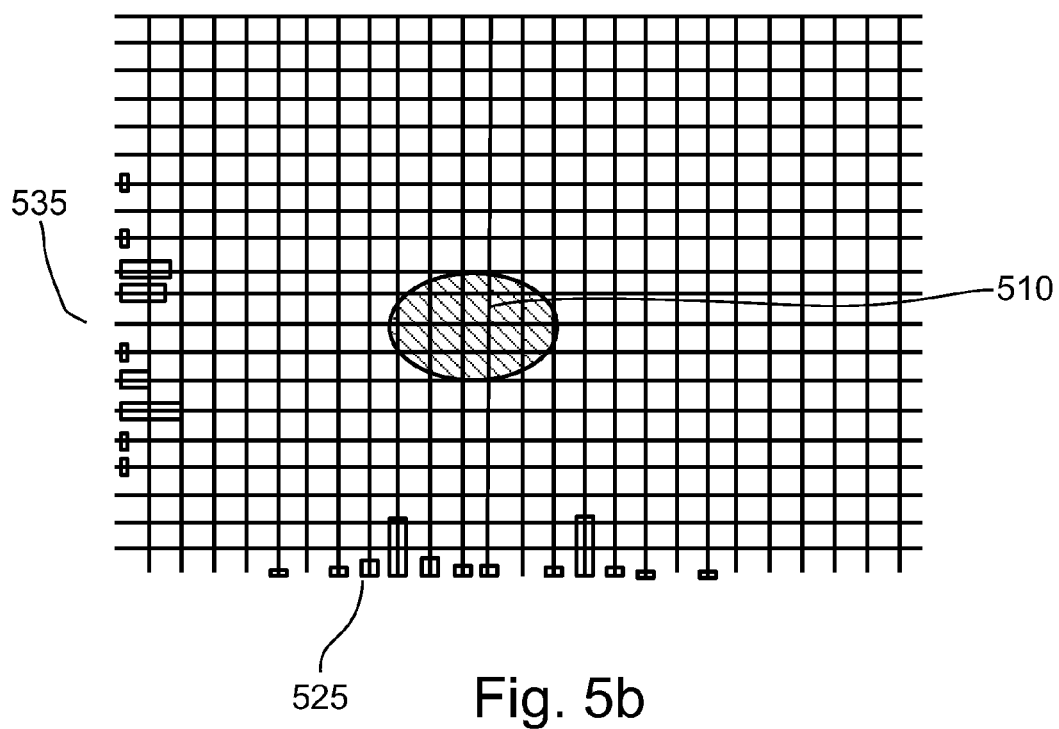
FIG. 5B is a schematic illustration of exemplary patterns of signal amplitude gradients obtained from touch input signals according to some embodiments of the present invention.

The present inventors have found that analysis of patterns of signal amplitudes and signal amplitude gradients can be implemented to distinguish between hover and touch events. Reference is now made to FIG. 5A showing an exemplary pattern of signal amplitudes during a finger touch event and to FIG. 5B showing an exemplary pattern of signal amplitude gradients determined from the pattern of signal amplitudes according to some embodiments of the present invention. In FIG. 5A, an area 510 over which a fingertip touches the digitizer sensor induces a plurality of signals on the vertical and horizontal conductive lines of the digitizer sensor. The amplitude of the detected signals sensed from the horizontal conductive lines are represented by bars 520 and the amplitude of the detected signals sensed from the vertical conductive lines are represented by bars 530. In some exemplary embodiments, signals are detected on conductive lines corresponding to area 510 as well as in neighboring conductive lines. Typically, the signals induced in the neighboring conductive lines occur due to mechanical changes of the sensor and the LCD when the fingertip presses down the digitizer sensor and LCD screen. In some exemplary embodiments, only amplitudes above a pre-defined level are considered. According to some embodiments of the present invention, when the conductive lines are coupled to differential amplifiers, output from one or more lines in the detected area may have a near zero detection where the area covers both inputs to the amplifier. In some exemplary embodiments, this can be avoided by spacing apart conductors coupled to the differential amplifier.

In FIG. 5B, the signal amplitude gradients are defined as the absolute values of the differences of amplitudes sensed on two neighboring conductive lines. Optionally the gradient is divided by the distance between the neighboring conductive lines. In some exemplary embodiments, only gradients above pre-defined level are considered. Gradient values determined from the horizontal conductive lines are represented by bars 525 and the amplitude of the detected signals sensed from the vertical conductive lines are represented by bars 535. The present inventors have found that fingertip touch typically results in detectibly higher gradient values and/or peak gradient values around the contour of area 510 as can be clearly seen in FIG. 5A and 5B. According to some embodiments of the present invention, detectibly higher gradient values and/or peak gradient values are defined as gradient values above a pre-defined threshold.

Figure 6A:
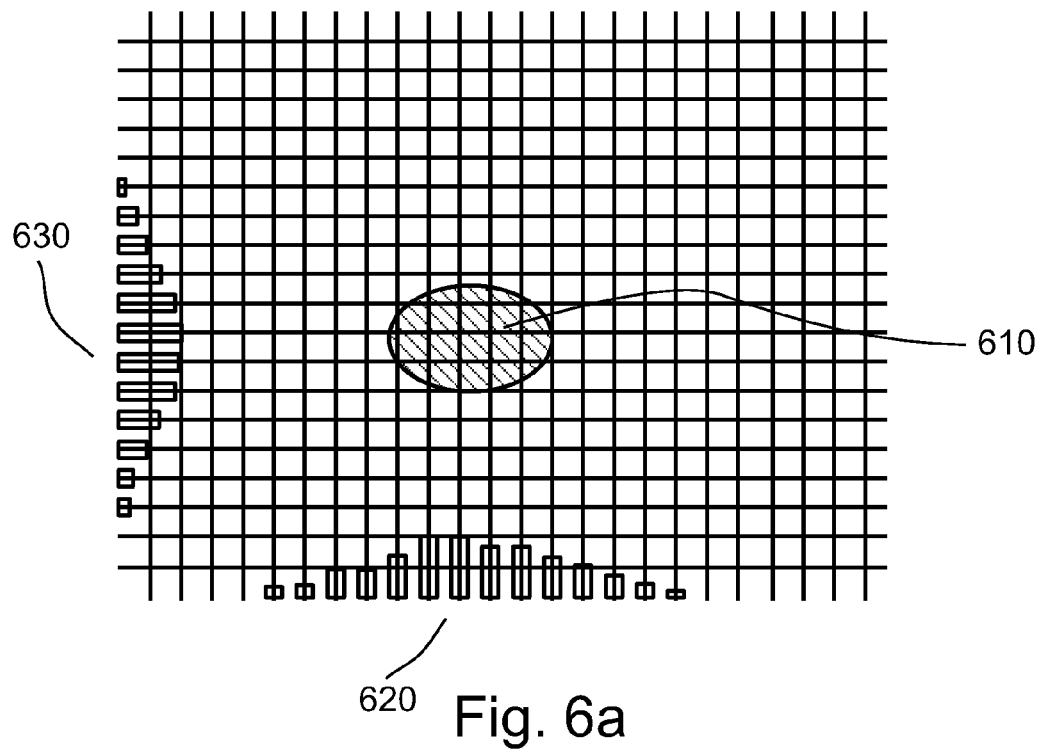
FIG. 6A is a schematic illustration of exemplary patterns of signal amplitudes obtained from hover input signals according to some embodiments of the present invention.
Figure 6B:
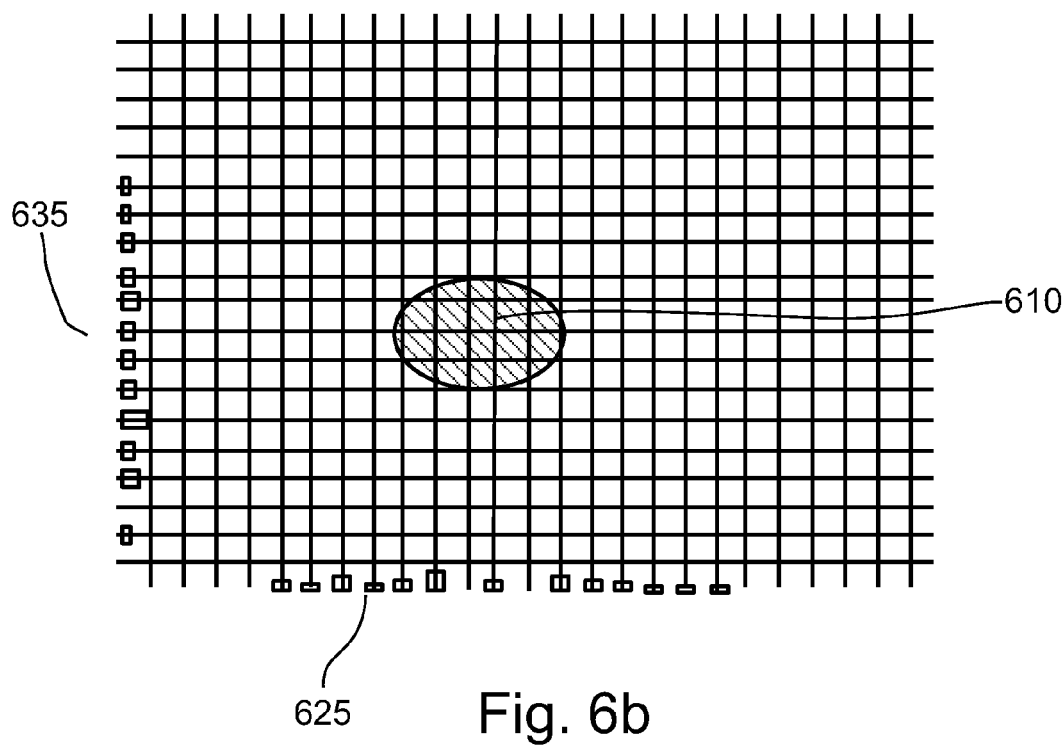
FIG. 6B is a schematic illustration of exemplary patterns of signal amplitude gradients obtained from hover input signals according to some embodiments of the present invention.

Reference is now made to FIG. 6A showing an exemplary pattern of signal amplitudes detected during a finger hovering event and to FIG. 6B showing an exemplary pattern of signal amplitude gradients determined from the pattern of signal amplitudes for a hover event according to some embodiments of the present invention. In FIG. 6A, an area 610 corresponding to a detected hover area induces a plurality of signals on the vertical and horizontal conductive lines of the digitizer sensor. The amplitude of the detected signals sensed from the horizontal conductive lines are represented by bars 620 and the amplitude of the detected signals sensed from the vertical conductive lines are represented by bars 630. In some exemplary embodiments, signals are detected on conductive lines corresponding to area 610 as well as in neighboring conductive lines. Typically, the signals derived from a hover event are spread over more conductive lines as compared to signals derived from a touch event (FIG. 5A). Typically, the amplitude value of a hover event is less than amplitude values detected during a touch. In some exemplary embodiments, only gradients above pre-defined level are considered. In FIG. 6B, the gradient signal amplitude gradients are defined as the absolute values of the differences of amplitudes sensed on two neighboring conductive lines. Optionally the gradient is divided by the distance between the neighboring conductive lines. Optionally the gradient is divided by the distance by an amplitude value detected on a conductive line. In some exemplary embodiments, only gradients above pre-defined level are considered.

Gradient values determined from the horizontal conductive lines are represented by bars 625 and the amplitude of the detected signals sensed from the vertical conductive lines are represented by bars 635.

The present inventors have found that for hovering events, the detected magnitude typically shows a steady decrease near the contour and/or edges of area 610 so that relatively low gradients near the contour are typically detected. According to some embodiments of the present invention, low gradient values are defined as gradient values below a pre-defined gradient threshold. As can be seen by comparing FIGS. 5 and 6, amplitude values in a touch event (as opposed amplitude values in a hover event) decreases sharply near the contour and/or edges of area 610 resulting in large edge and/or contour gradients.

Figure 7:
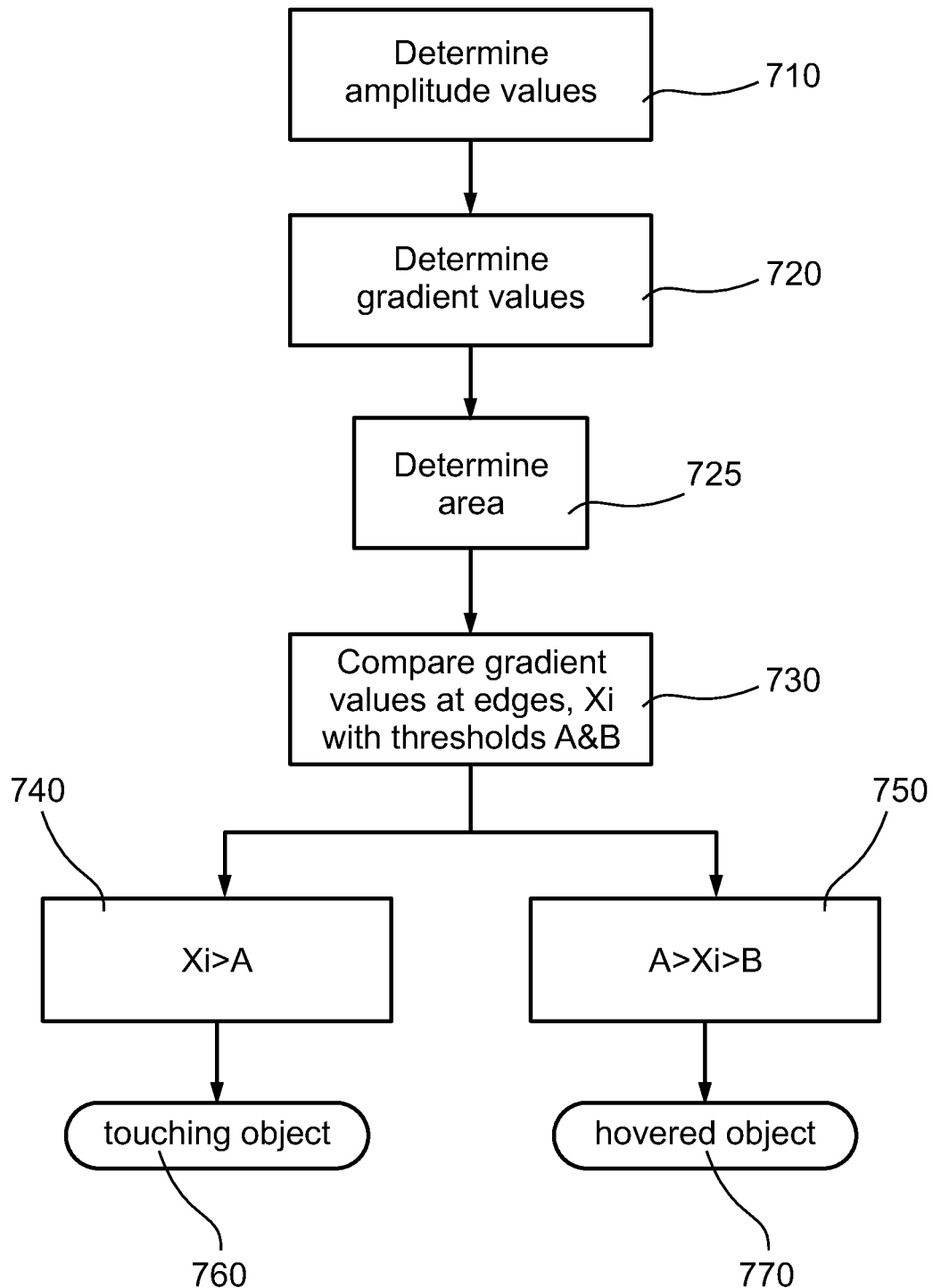
FIG. 7 is an exemplary flow chart of a method for distinguishing between hover input signals and touch input signals according to some embodiments of the present invention.

Reference is now made to FIG. 7 showing an exemplary flow chart of a method for distinguishing between hover input signals and touch input signals according to some embodiments of the present invention. According to some embodiments of the present invention, amplitude values detected on horizontal and vertical conductive lines of the digitizer are determined (block 710). Based on the detected amplitude values, gradient values corresponding to the amplitude values detected on horizontal and vertical conductive lines of the digitizer are determined (block 720). Optionally, the area of the event (either touch and/or hover) is determined (block 725). Gradient values, X, (where i is an index for each of the conductive lines horizontal and/or vertical), corresponding to conductive lines around the contour of the detected event are compared to one or more thresholds, e.g. two thresholds (block 730). For determined gradient values greater than or equal to a touch threshold, the detected event is defined as a touch event (block 760). For determined gradient values less than the touch threshold but greater than or equal to a hover threshold, the detected event is defined as a hover event (block 760). Some of the methods and the system described in U.S. patent application Ser. No. 11/808,868, entitled "Fingertip Touch Recognition for a Digitizer" filed on Jun. 13, 2007 assigned to the common assignee and hereby incorporated by reference may be applied to determine touch event amplitude and gradient patterns of input signals.

Figure 8:
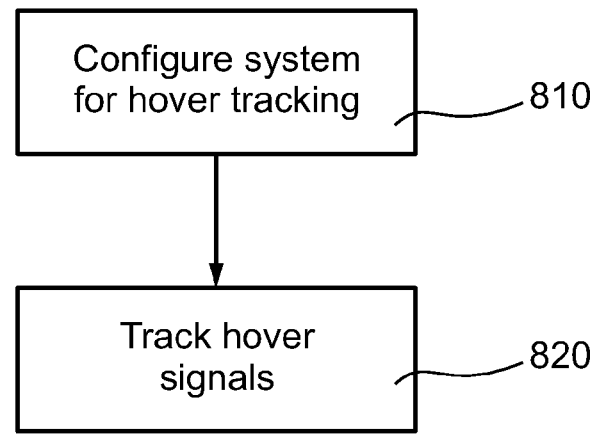
FIG. 8 is a flow chart of an exemplary method for tracking a hover input signal, according to some embodiments of the present invention.

Reference is now made to FIG. 8 showing an exemplary method for tracking a hover input signal, according to some embodiments of the present invention. According to some embodiments of the present invention, digitizer system 100 includes pre-defined configurations for tracking hover events and may include one or more parameters settings specific for tracking hover events. According to some exemplary embodiments, once a hover event is detected, e.g. by any of the methods described herein, digitizer system 100 is configured for hover tracking (block 810) and input signals to the digitizer sensor are processed for tracking the hover signal (block 820). According to other exemplary embodiments, digitizer system may be configured to track hover events as a default setting. According to some embodiments of the present invention, when a hover event turns into a touch event there is an automatic changeover to touch settings.

According to other exemplary embodiments, a user may perform a gesture indicating to the digitizer to configure the digitizer system for hover tracking. A gesture can be a hover gesture, a touch gesture, and/or a combination hover touch gesture. In one exemplary embodiment, a gesture includes a hover and touch gesture performed substantially simultaneously, e.g. using two fingers. As used herein the term gesture is a purposeful pre-defined motion that a user makes to indicate a command to the system. Some examples of gestures include one or more tapping motions with a user interaction, a double click, drawing a pre-defined shape, moving a user interaction in a specific direction along the digitizer sensor, etc.

One or more parameters settings typically used for touch detection may be altered to accommodate tracking hover events. Typically the amplitude of an input signal detected during a hover event is significantly smaller than the input signal detected during a touch event. As such the signal to noise ration may be too low for accurate determination of position and therefore tracking of a hover event may be difficult when using touch tracking settings. According to some exemplary embodiments, a pre-defined configuration for tracking a hover event includes sampling the detected input signal with an increased number of bits as compared to the number of bits used for sampling a touch event.

According to some exemplary embodiments, a pre-defined configuration for tracking a hover event includes implementing increased and/or boosted power and/or amplitude of an interrogating detecting signal, e.g. current Ia (FIG. 2) or signal 60 as compared to the interrogating detecting signal used for detecting touch input. According to some exemplary embodiments, a pre-defined configuration for tracking a hover event includes implementing a higher gain factor for the amplifiers connected to the conductive lines of the digitizer.

According to some embodiments of the present invention, transmitting stronger signal and/or implementing higher gain, may result in saturation when a finger is touching the sensor or false detection due to parasitic capacitance. For example, when using the junction capacitive method, parasitic capacitance at the junctions can cause a signal detection which is above a threshold set for object detection. According to some embodiments of the present invention, the affect of parasitic capacitance is overcome by connecting pairs of parallel spaced apart conductive lines to differential amplifiers. Unbalanced parasitic capacitance can be compensated for by coupling capacitors to the conductive lines by methods described in incorporated U.S. patent application Ser. No. 11/798,894.

Figure 9:
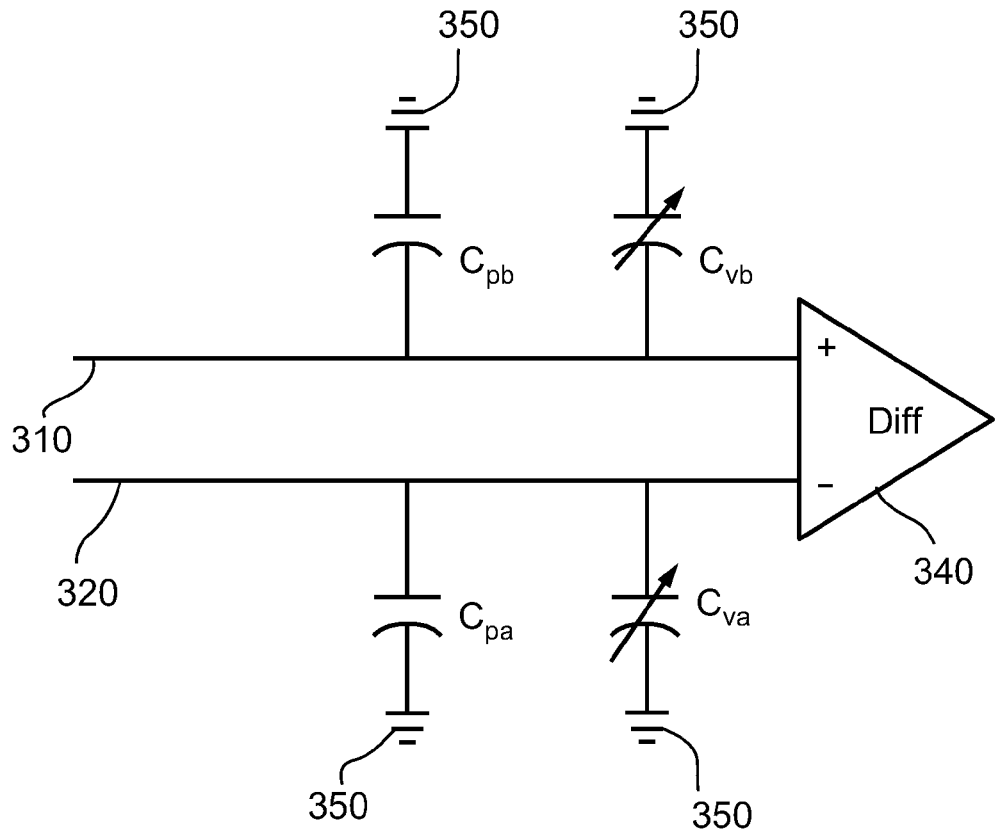
FIG. 9 is an exemplary circuit diagram of two parallel conductive lines of a digitizer that are input to a differential amplifier where each of the two conductive lines is coupled to a variable capacitor, according to some embodiments of the present invention.

Reference is now made to FIG. 9 showing an exemplary circuit diagram of two parallel conductive lines 310A and 320A of a digitizer that are input to a differential amplifier 340 having unbalanced parasitic capacitance $C_{pa}$ and $C_{pb}$. According to some embodiments of the present invention, unbalanced parasitic capacitance develops due to slight differences in distance between the digitizer and screen in specific areas, material structure in specific areas of the digitizer screen, environmental conditions and parasitic capacitance on associated PCB. The unbalanced capacitance creates an unbalance steady state noise level of the lines resulting in an amplified non-zero steady state signal being produced by the differential amplifier. According to some embodiments of the present invention, balancing the parasitic capacitance $C_{pa}$ and/or $C_{pb}$ is achieved by adding one or more variable capacitors, $C_{va}$ and/or $C_{vb}$, on one or more conductive lines of pairs connected to differential amplifier 340. As such, the signal arising from different parasitic capacitance between the two conductive lines can be substantially eliminated so that an input signal is not detected unless an object touches and/or hovers on one of the junctions.

Figure 10:
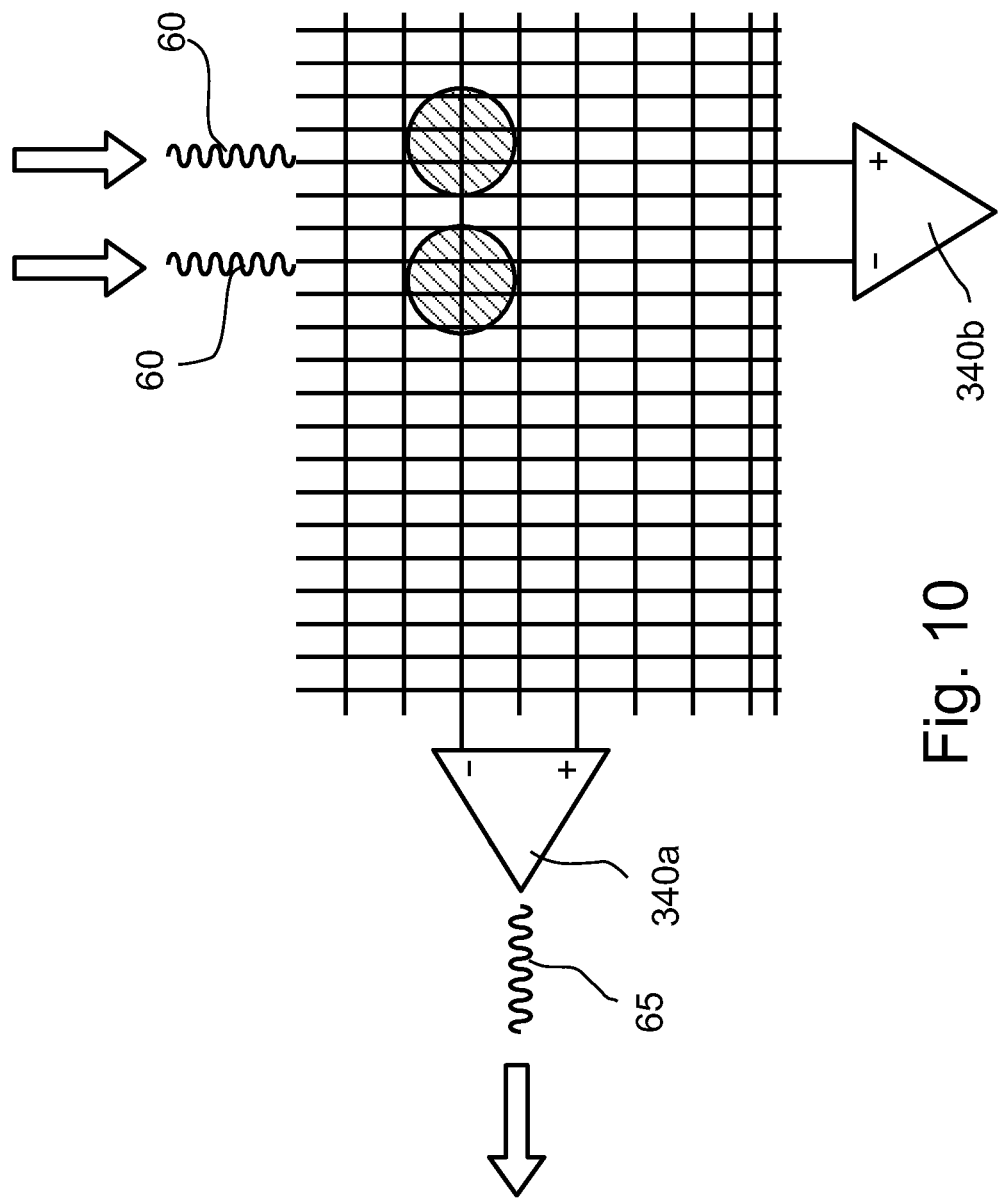
FIG. 10 is a schematic illustration of a digitizer sensor for finger touch detection based on a junction capacitive touch method for detecting finger touch including a signal transmitted to pairs of parallel conductive lines of the digitizer sensor according to some embodiments of the present invention.

According to some exemplary embodiments, an interrogating detecting signal can be implemented on each of the conductive lines associated with a differential amplifier to facilitate detection of a plurality of hover events associated with a single conductive line. Reference is made to FIG. 10 showing a schematic illustration of a digitizer sensor for finger hover detection based on a junction capacitive touch method for detecting finger touch including a signal transmitted to pairs of parallel conductive lines of the digitizer sensor according to some embodiments of the present invention. Interrogating detecting signals 60 and 61 are transmitted over both conductive lines couple to a differential amplifier to detect position of a hover event 41.

Figure 11:
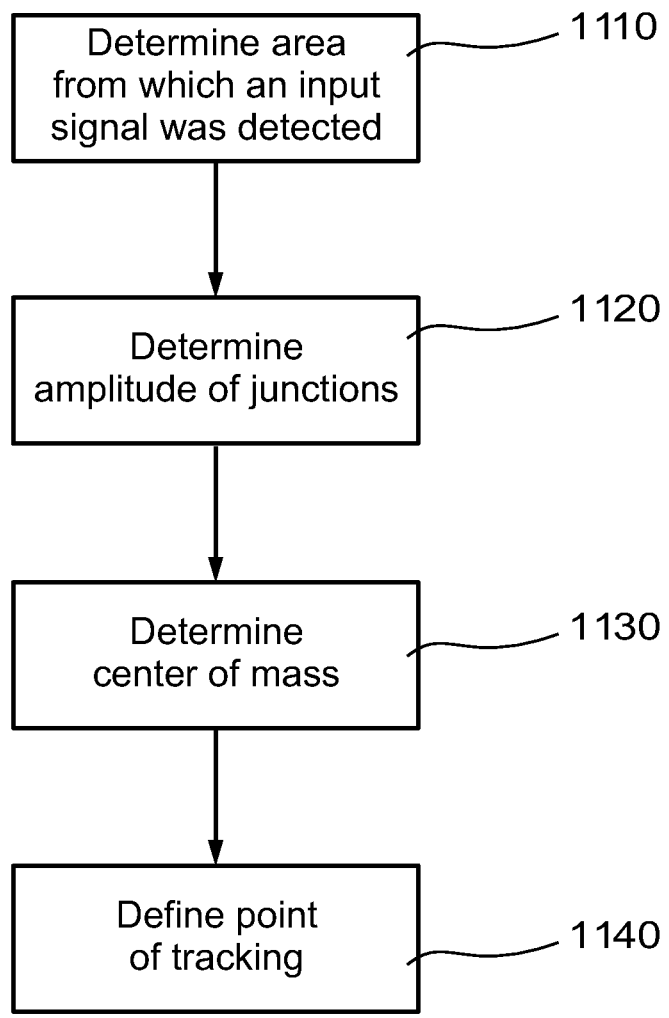
FIG. 11 is a flow chart of an exemplary method for determining a tracking point from a hover input signal, according to some embodiments of the present invention.

According to some embodiments of the present invention, a hover event is used for controlling cursor position on a display screen associated with the digitizer. Reference is now made to FIG. 11 describing an exemplary method for determining a tracking point from hover input signals, according to some embodiments of the present invention. According to some embodiments of the present invention, an area from which an input signal, e.g. a hover input signal, has been detected (block 1110) is estimated and/or determined. A method for estimating an area corresponding to a touch event is described in incorporated US Patent Application No. 20060012580. Similar methods can be implemented for the present invention. In some embodiments, a rectangular region corresponding to the horizontal and vertical lines detecting an input signal is determined. Signal amplitudes associated with sensor junctions or sensor lines within the detected area are determined (block 1120). A center of mass of the area is estimated based on the determined amplitudes (block 1140). According to some embodiments of the present invention, center of mass may be estimated by performing a weighted average of the detected amplitudes of input signals from each of the conductive lines from which a signal was detected. The tracking point is determined according to the defined center of mass of the detected and/or estimated area and the shape of the detected area (block 1140).

According to some exemplary embodiments, the height above which an object is hovering is directly related to the amplitude of the detected signal. According to some embodiments of the present invention, a relative height over time and/or a change in height over time is determined, for example, to determine if the finger and/or hand is approaching and/or receding from the digitizer sensor. According to some embodiments of the present invention, input signals to the digitizer are derived from the capacitive coupling between the user's finger and/or hand and the conductive lines of the digitizer sensor, the amplitude of the received signal is a function of one or more parameters, such as the area over which a finger and/or hand hovers over the digitizer sensor, the height of the finger and/or hand in relation to the digitizer sensor etc. As the user's finger and/or hand approaches to the digitizer sensor, the signal's amplitude increases. As such the amplitude of the detected input signal can be used to detect that a finger and/or hand is approaching and/or receding from the digitizer sensor.

Figure 12:
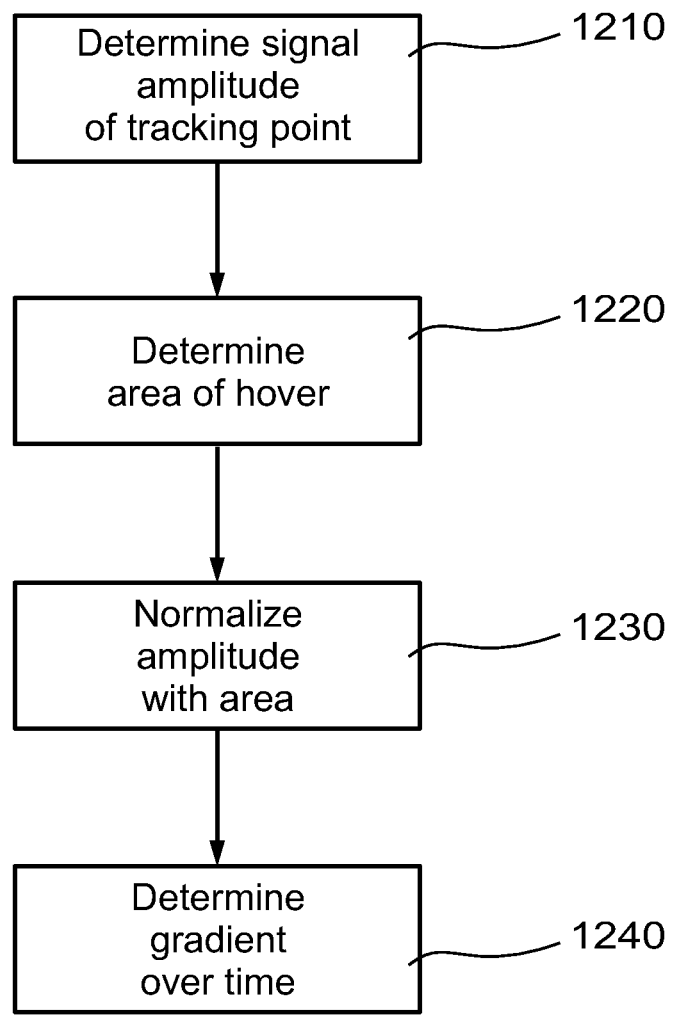
FIG. 12 is a flow chart of an exemplary method for tracking changes in height of an object hovering over a digitizer sensor according to some embodiments of the present invention.

Reference is now made to FIG. 12 describing an exemplary method for tracking changes in height of an object hovering over a digitizer sensor according to some embodiments of the present invention. According to some embodiments of the present invention, signal amplitude of a tracking point of a hovered object is determined (block 1210). Optionally, an area of the hovered object detected by the digitizer sensor is determined (block 1220). Optionally, the signal amplitude is normalized by the hover area (block 1230). Changes in the height (corresponding to amplitude and/or amplitude over area) are determined over time (block 1240). Positive and/or negative gradients can be used to determine approach or recession of the finger and/or hand. Speed of approach and/or other parameters may be determined as well.

Typically, the height of a finger and/or hand determined is the height between the sensor and the lower surface of the object and/or the surface of the object closest to the sensor. In some exemplary embodiments, only the height of the tracking point of the finger and/or hand is determined and used to represent the height of the finger and/or hand. In one exemplary embodiment, the height at each junction point is determined to obtain for example, a surface map of the finger and/or hand.

According to some embodiments of the present invention, for systems providing user specific recognition of user interaction as is described in US Patent Application entitled "User Specific Recognition of Intended User Interaction with a Digitizer" assigned to the common assignee, filed on even date herewith and hereby incorporated by reference can be used to determined absolute heights of a hovering object based on a amplitude of a detected user's input signal. For example, during a calibration procedure, a user may be requested to position one or more fingers at one or more specified heights over the digitizer sensor. Signal amplitudes may be stored and used to determine absolute heights during a user's operation of the digitizer system.

Figure 13:
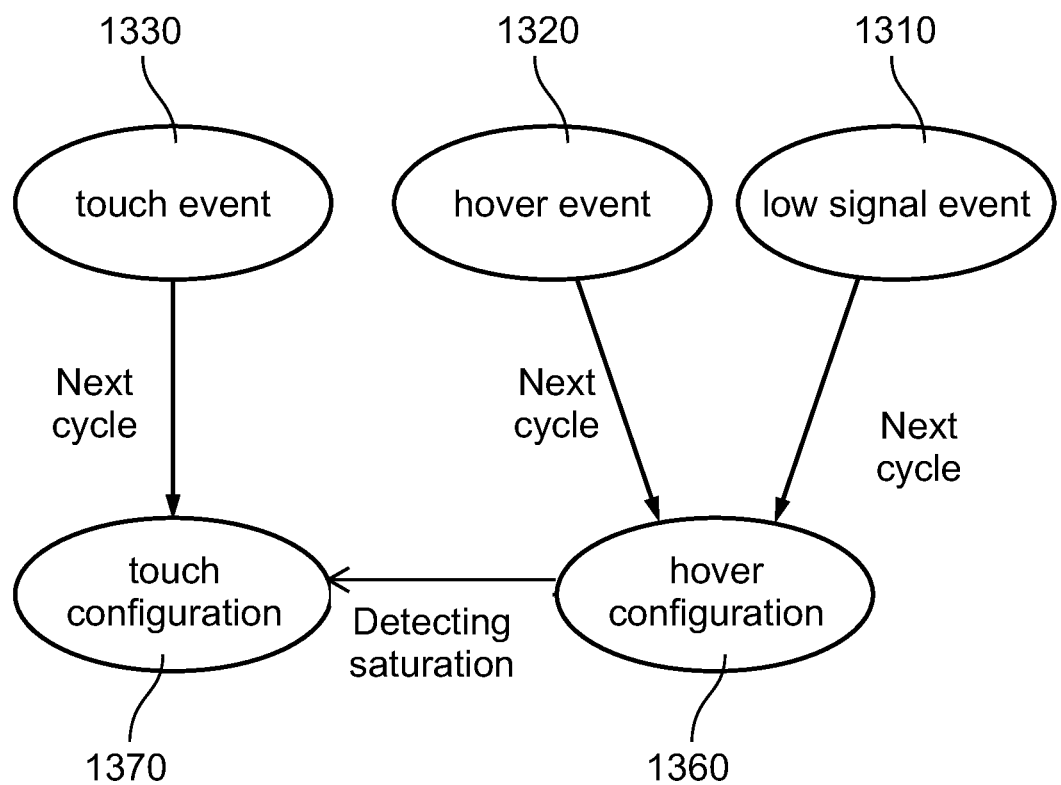
FIG. 13 is a flow chart of an exemplary method for switching between hover and touch tracking according to some embodiments of the present invention.

According to some embodiments of the present invention a system and methods are provided for switching between hover and touch detection during operation of the digitizer system. Reference is now made to FIG. 13 describing an exemplary method for switching between hover and touch tracking according to some embodiments of the present invention. According to some embodiments of the present invention, during operation of a digitizer system, one of three events may be detected according to methods described herein, e.g. a touch event (block 1330), a hover event (block 1320), and low signal event (block 1310) where no input signal is detected and/or a signal below a pre-define threshold is determined. Typically detection is performed over a time span during sampling cycles. According some embodiments of the present invention, if during a current cycle, a touch event is detected (block 1330), in a following cycle, the digitizer system will configure itself for touch tracking and/or touch detection as described herein, for example, by implementing a touch amplification factor (block 1370). Similarly, if during a current cycle, a hover event is detected (block 1310) and/or a low signal event is determined, in the following cycle, the digitizer system will configure itself for hover tracking and/or detection as described herein, for example, by implementing a hover amplification factor (block 1360). According to some exemplary embodiments, a switch between a hover detection configuration (1360) and a touch detection configuration will be made when saturation and/or a pre-defined level of saturation is determined from a hover digitizer configuration. Typically the hover detection configuration is used as a default and/or initial setting since an object naturally hovers over the digitizer prior to touching and/or as it approaches the digitizer to touch it. A switch from a touch detection configuration back to a hover detection configuration is made when the amplitude of the detected signal is below a pre-defined null threshold, e.g. a low signal event (block 1310). Other described methods for distinguishing between a touch and/or hover event (besides and/or in addition to detecting low signal signals and/or saturation as is described in reference to FIG. 13) may be implemented.

Figure 14:
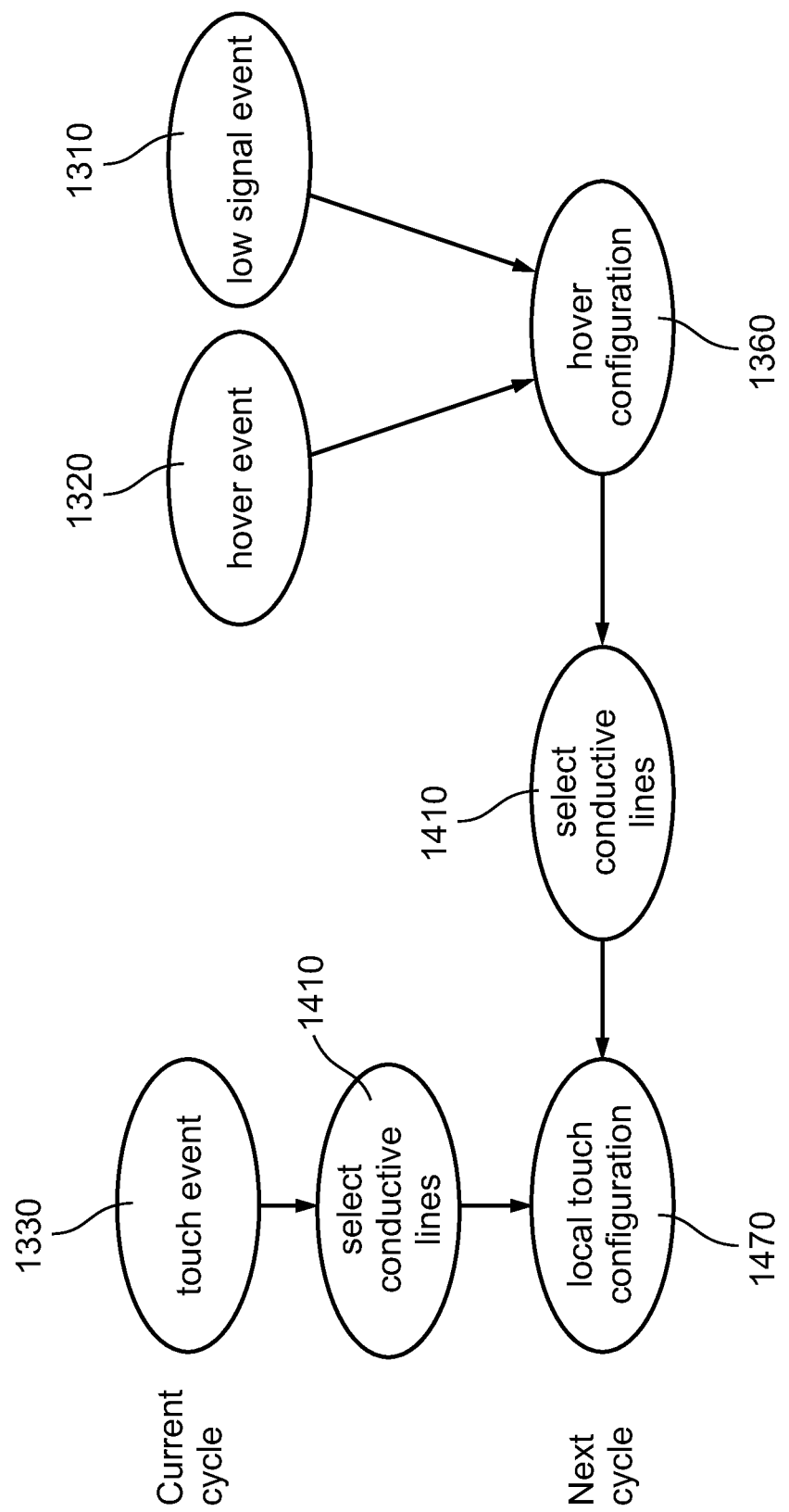
FIG. 14 is a flow chart of an exemplary method for simultaneous hover and touch tracking according to some embodiments of the present invention.

According to some embodiments of the present invention a system and method is provided for simultaneous hover and touch detection. Reference is made to FIG. 14 describing an exemplary method for simultaneous hover and touch tracking according to some embodiments of the present invention. According to some embodiments of the present invention, during operation of a digitizer system, one of three events may be detected using methods described herein, e.g. a touch event (block 1330), a hover event (block 1320), and low signal event (block 1310) where no input signal is detected and/or a signal below a pre-define threshold is determined. Typically detection is performed once per sampling cycle. According some embodiments of the present invention, if during a current cycle, a hover event is detected (block 1310) and/or a low signal event is determined, in a following cycle, the digitizer system will configure itself for hover tracking and/or detection as described herein, for example, by implementing a hover amplification factor (block 1360). Alternatively, if during a current cycle, a touch event is detected (block 1330), conductive lines associated with the touch event are detected (block 1410) and in the following cycle, the digitizer system will locally configure itself for touch tracking and/or detection in the detected conductive lines associated with the touch event (block 1470). For example, a touch amplification factor may be implemented for those specific lines. According to some embodiments of the present invention, a touch amplification factor may be implemented for those specific lines in addition to lines in the vicinity of the touch detection. According to some exemplary embodiments, a switch from a hover detection configuration (1360) to a local touch detection configuration (block 1470) on a selective number of conductive lines is made when saturation and/or a pre-defined level of saturation is detected in part of the digitizer sensor. Conductive lines associated with and/or near the touch event are detected (block 1410) for the current cycle where saturation has been determined and, the digitizer system will locally configure itself for touch tracking and/or detection in those detected conductive lines associated with or optionally also near the touch event (block 1470). Typically hover detection configuration is used as a default and/or initial setting since an object naturally hovers over the digitizer prior to touching and/or as it approaches the digitizer to touch it. According to some embodiments of the present invention, a switch back from a touch detection configuration to a hover detection configuration for those specific lines is implemented when a low signal is detected, e.g. a low signal event (block 1310). Other described methods for distinguishing between a touch and/or hover event (besides and/or in addition to detecting low signal signals and/or saturation, for example, as is described in reference to FIG. 13) may be implemented. Alternatively, simultaneous detection is facilitated by implementing system setting for hover detection on some of the conductive lines, e.g. every other conductive line, every 3 conductive line, etc., and implementing system setting for touch detection on the other the conductive lines.

According to some embodiments of the present invention detection of a hover event as a precursor to a detected touch event is provided and implemented for palm rejection. Palm rejection is typically required to reject input signals derived from a user placing and/or resting a hand over the digitizer sensor while using a stylus and/or fingertip for user interaction with the digitizer system. Often, the hand resting and/or hovering over the sensor may be mistaken as a user intended user interaction with the digitizer.

Figure 15:
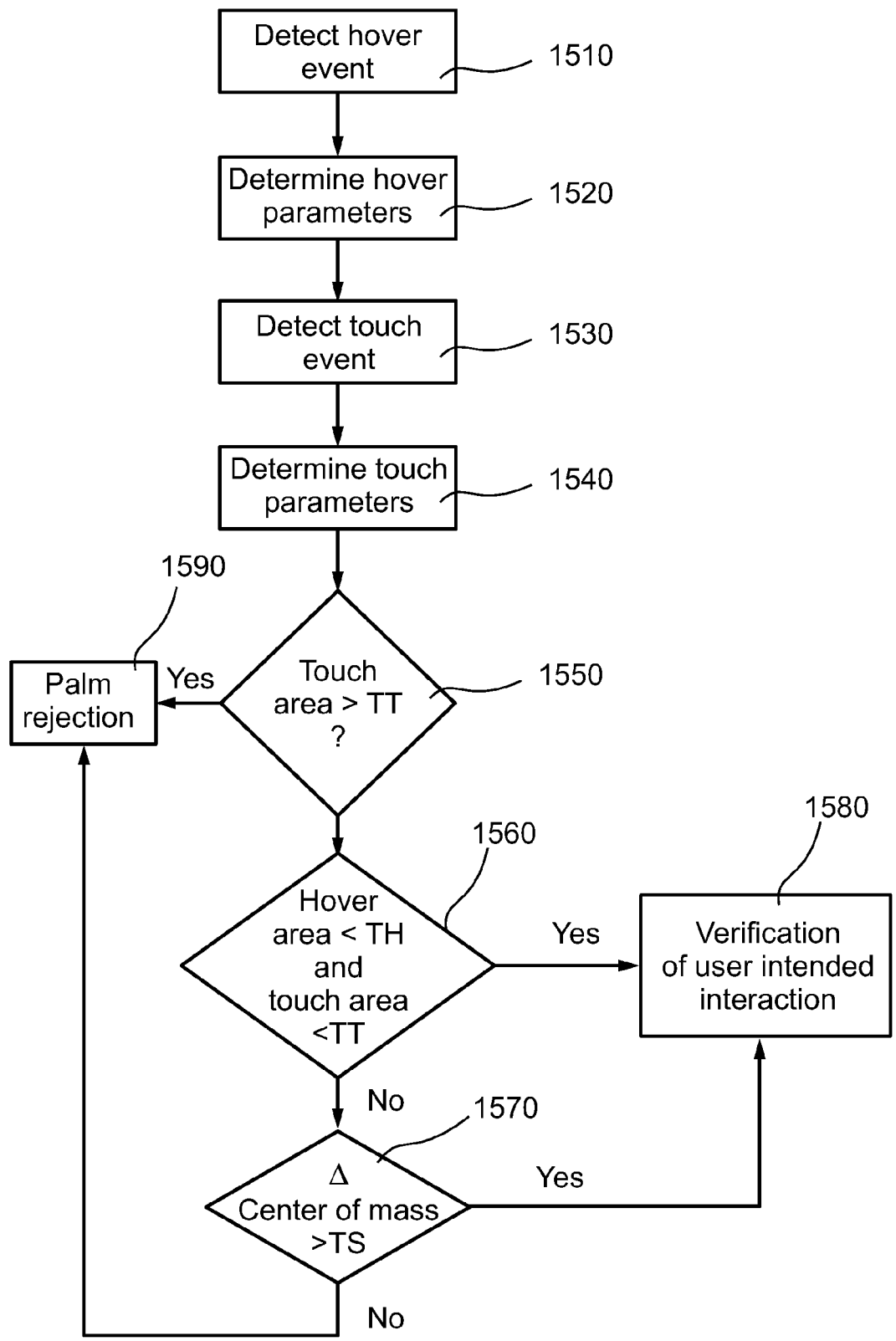
FIG. 15 is a flow chart of an exemplary method for palm rejection based on analysis of hover events that are precursors to touch events according to some embodiments of the present invention.

Reference is made to FIG. 15 describing an exemplary method for palm rejection based on analysis and/or processing of hover events that serve as precursors to touch events according to some embodiments of the present invention. According to some embodiments of the present invention, a hovering event is used to provide 'history' information regarding a subsequent touch event. According to some embodiments of the present invention one or more features of a hover and related touch event are used, detected and/or analyzed to verify a user intended user interaction and/or are used for palm rejection. The digitizer system searches for a hover event until a hover event is detected (block 1510). Parameters of the detected hover event are determined (block 1520), e.g. area of the hover object, center of mass of the detected area, and/or center of the detected area. Optionally, gesture recognition is performed to determine if the hover event is an intended pre-defined gesture. Subsequent to hover detection, a touch event is sought (block 1530). Parameters of the detected touch event are determined (block 1540), e.g. area of the touch object, center of mass of the detected area, and/or center of the detected area. Hover area and touch area are compared with a respective pre-defined hover area threshold and a pre-defined touch area threshold. A query is made to determine if the touch area is larger than its pre-defined threshold, TT (block 1550). When touch area is found to be relatively large, palm rejection is performed (block 1590) to reject the touch input signal for user interaction. This case typically reflects a hand or a palm touching the digitizer sensor. For a case where the query in block 1550 is negative a new query is made to determine if both the hover area and the touch area are smaller than their respective pre-defined thresholds (block 1560). When both the hover area and the subsequent touch area were both found to be relatively small, the touch signal is verified for user interaction (block 1580). This case typically reflects a finger hovering over and then touching the digitizer sensor. Optionally prior to verifying a touch signal for user interaction, a verification of the touch pattern based on a pattern of signal amplitudes and gradients determined from the conductive lines of the digitizer sensor is also performed. Methods for performing verification of the touch pattern performed based on a pattern of signal amplitudes and gradients are described with further detail in incorporated U.S. patent application Ser. No. 11/808,868 filed on Jun. 13, 2007 and assigned to the common assignee. According to one exemplary embodiment, touch verification based on amplitude and gradient patterns and touch verification based on other methods described herein can be perform simultaneously and/or substantially simultaneously.

For other cases a difference in the center of mass for the hover event and subsequent touch event is determined and a query is made to determine if the difference is above a pre-defined shift threshold (block 1570). Optionally, a center of detected area can be used instead of a center of mass. The present inventors have found that a change in the center of mass can be used to differentiate between a hand hovering over a digitizer sensor and a subsequent finger touching the digitizer sensor and a first or a hand hovering and then touching a digitizer sensor. According to embodiments of the present invention an example of a substantial change in the center of mass is when a hand hovers over a screen (having a center of mass around the middle of the hand) and then a finger which is at the end of the hand, touches the screen. For cases when the change in the center of mass between the hover event and the touch event is large, e.g. above the pre-defined threshold, the input touch signal is verified for user interaction (block 1580). Otherwise a palm rejection is performed (block 1590). According to embodiments of the present invention, an example of a non-substantial change and/or small change in the center of mass, e.g. that would lead to palm rejection, is when a hand hovers over a display screen (having a center of mass around the middle of the hand) and then the hand rests on the digitizer sensor. Optionally prior to verifying a touch signal for user interaction, a verification of the touch pattern based on a pattern of signal amplitudes and gradients determined from the conductive lines of the digitizer sensor is also performed.

Figure 16:
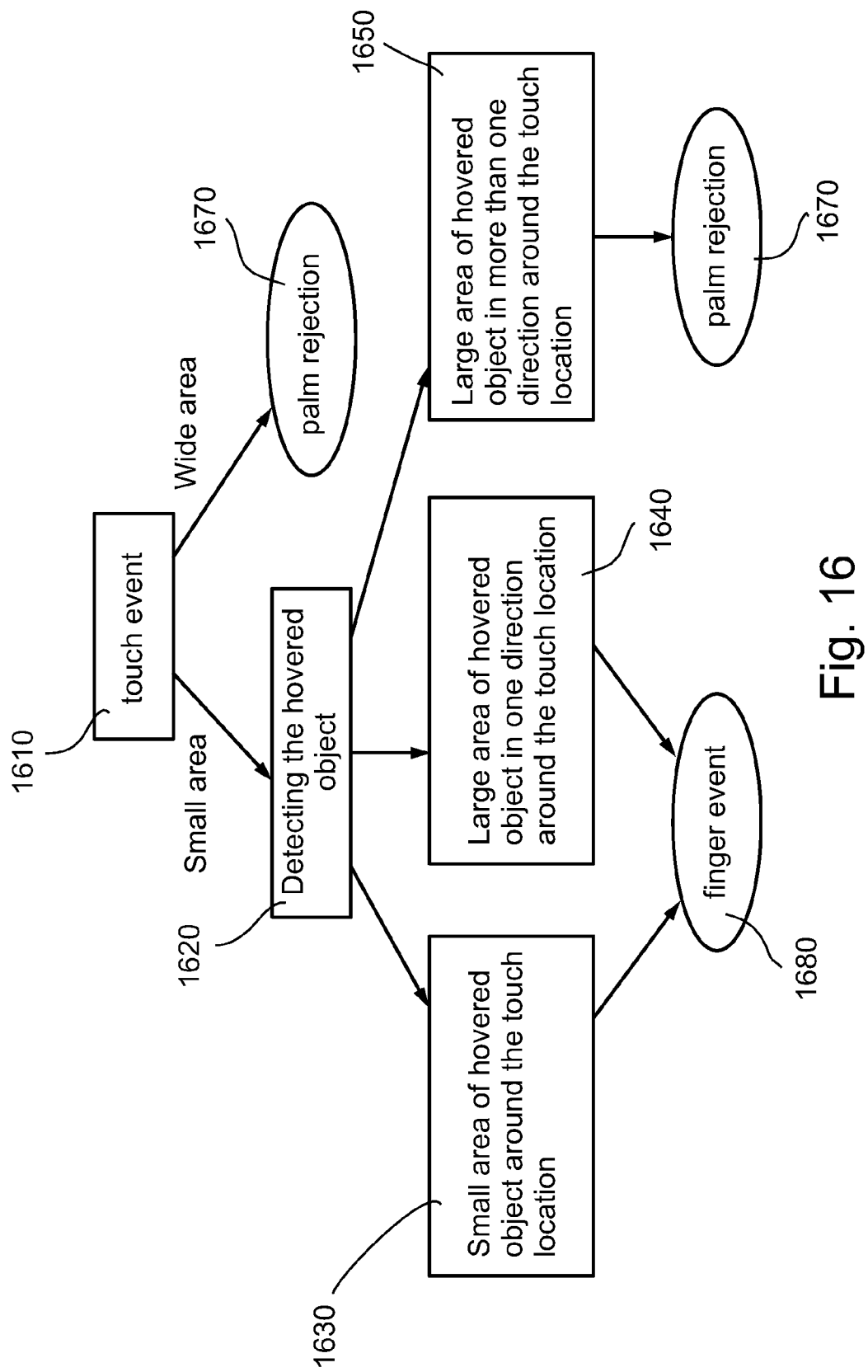
FIG. 16 is a flow chart of an exemplary method for palm rejection based on analysis of simultaneously detected hover and touch events, according to some embodiments of the present invention.

Reference is now made to FIG. 16 describing an exemplary method for palm rejection based on analysis of simultaneously detected hover and touch events, according to some embodiments of the present invention. According to some embodiments of the present invention, a touch event is sought (block 1610). According to some embodiments of the present invention, touch events are detected based on methods described herein for simultaneous detection of both hover and touch. Upon detection of a touch event, an area of the touch event is determined. For areas above a pre-defined touch threshold, palm rejection is performed and the touch event is rejected for user interaction (block 1670). Otherwise the hover events simultaneously detected on the sensor are analyzed. If a small area of hovered object is detected around the touch location (block 1630) and/or if a larger area of hover is detected on one side of the touch location (block 1640) a user intended user interaction is verified, e.g. a finger touch and the input signal is used for user interaction. For cases where a large area of a hovered object is detected in more than one side of the touch location (block 1650), palm rejection is performed (block 1670).

Figure 17:
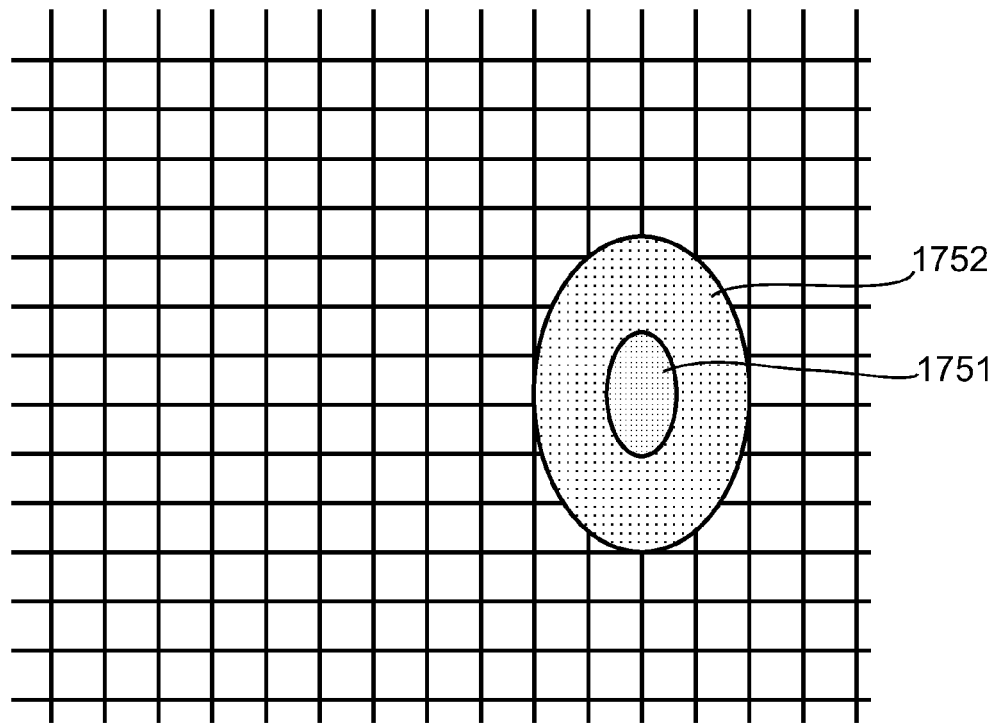
FIG. 17 is a schematic illustration showing simultaneous hover and touch detection on a digitizer resulting in palm rejection according to some embodiments of the present invention.

Reference is now made to FIG. 17 showing simultaneous hover and touch detection on a digitizer resulting in palm rejection according to some embodiments of the present invention. Touch area 1751 is surrounded by a relatively large hover area 1752. Such detection is typically caused by a palm hovering over a digitizer sensor and only partially touching the digitizer sensor. In this exemplary embodiment, although the detected touch area is small, the large hover area 1752 indicates that the event is a palm event. As such, the detected signal is rejected as an unintended user interaction.

Figure 18:
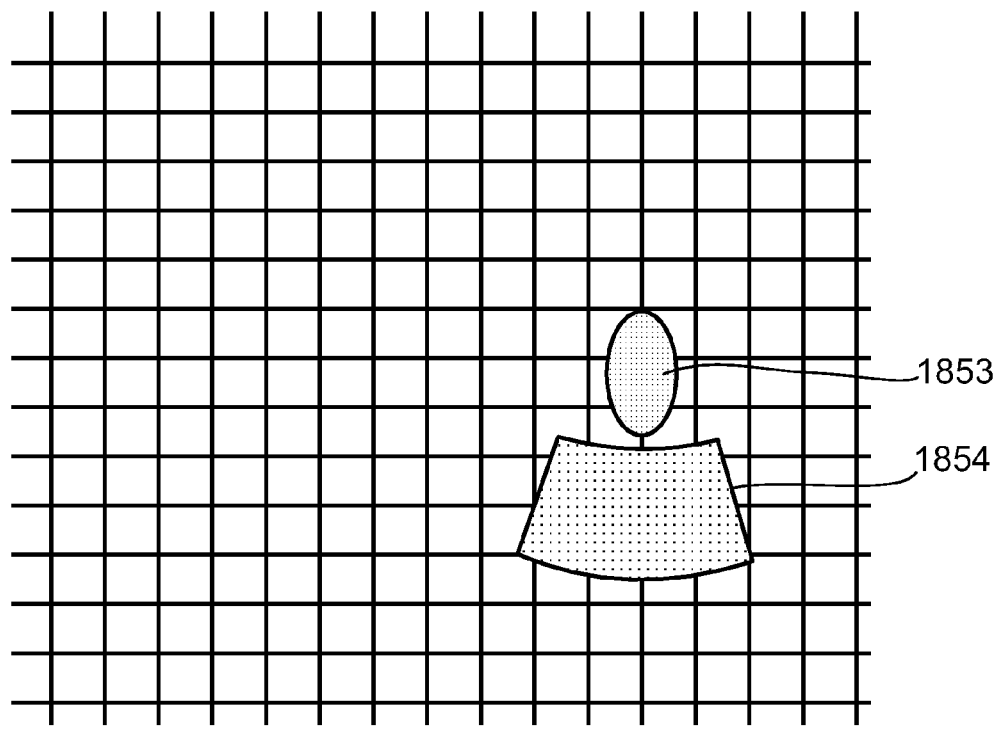
FIG. 18 is a schematic illustration showing simultaneous hover and touch detection on a digitizer resulting in user interaction verification according to some embodiments of the present invention.

Reference is now made to FIG. 18 showing simultaneous hover and touch detection on a digitizer resulting in user interaction verification according to some embodiments of the present invention. Touch area 1853 has a hover area 1854 on one side of the touch area. Such detection is typically reflected by a hand hovering over a digitizer sensor while a fingertip touches the sensor. As such, the detected signal is verified as an intended user interaction.

According to some embodiments of the present invention, a touch area surrounded by a small hover area is typically reflected by a finger touching and partially hovering over a digitizer sensor. As such, the detected signal is verified as an intended user interaction.

As used herein the term event, e.g. hover event or touch event, on a digitizer sensor corresponds to input signals detected over a substantially concentrated position and/or area on a digitizer.

Although the system and method described herein has been mostly described in reference to user specific finger touch recognition on a digitizer, a similar system and method can be used for user specific recognition of other intended user interactions with a digitizer. For example recognition of finger hovering over a digitizer, stylus hovering over a digitizer, stylus touch on a digitizer, etc.

It should be further understood that the individual features described hereinabove can be combined in all possible combinations and sub-combinations to produce exemplary embodiments of the invention. Furthermore, not all elements described for each embodiment are essential. In many cases such elements are described so as to describe a best more for carrying out the invention or to form a logical bridge between the essential elements. The examples given above are exemplary in nature and are not intended to limit the scope of the invention which is defined solely by the following claims.

The terms "include", "comprise" and "have" and their conjugates as used herein mean "including but not necessarily limited to".

What is claimed is:

1. A method comprising:
   detecting a touch event;
   determining at least one spatial characteristic of the touch event;
   detecting a hover event;
   determining at least one spatial characteristic of the hover event,
   wherein the at least one spatial characteristic of the touch event includes area on the digitizer sensor spanned by the touch event and the at least one spatial characteristic of the hover event includes area on the digitizer sensor spanned by the hover event; and
   verifying or rejecting the touch event as an intended user interaction with a digitizer sensor based on the spatial characteristics determined for both the touch event and the hover event.

2. The method according to claim 1, wherein the touch event is verified as an intended user interaction responsive to the area spanned by the hover event being less than a pre-defined hover area threshold and the area spanned by the touch event being less than a pre-defined touch area threshold.

3. The method according to claim 1, wherein the at least one spatial characteristic of the touch event and the hover event includes location of the hover event in relation to location of the touch event; and wherein the touch event is verified responsive to both the area spanned by of the hover event and the location of the hover event in relation to the location of the touch event.

4. The method according to claim 3, wherein determining location of the hover event in relation to location of the touch event includes determining whether the hover event substantially surrounds the touch event.

5. The method according to claim 4, wherein the touch event is rejected as an intended user interaction responsive to the area spanned by of the hover event being greater than a pre-defined hover area threshold and responsive to the hover event substantially surrounding the touch event.

6. The method according to claim 4, wherein the touch event is verified as an intended user interaction responsive to the area spanned by of the hover event being less than a pre-defined hover area threshold and responsive to the hover event substantially surrounding the touch event.

7. The method according to claim 1, wherein the at least one spatial characteristic of the touch event includes location of the touch event on the digitizer sensor and the at least one spatial characteristic of the hover event includes location of the hover event on the digitizer sensor; and wherein the touch event is verified as an intended user interaction responsive to determining that the hover event is only located on one side of the touch event.

8. The method according to claim 1, wherein the at least one spatial characteristic of the touch event includes center of mass of the touch event and wherein the at least one spatial characteristic of the hover event includes center of mass of the hover event, wherein the center of mass of each of the touch event and the hover event is determined from signal amplitudes detected at a plurality of sensor junctions of the digitizer sensor, and wherein the touch event is verified or rejected as an intended user interaction responsive to a distance between the center of mass of the hover event and the center of mass of the touch event.

9. The method according to claim 8, wherein the touch event is verified as an intended user interaction responsive to the distance being larger than a pre-defined shift threshold.

10. The method according to claim 1, wherein the at least one spatial characteristic of the touch event includes center of the area spanned by the touch event and wherein the at least one spatial characteristic of the hover event includes center of the area spanned by the hover event, and wherein the touch event is verified or rejected as an intended user interaction responsive to a distance between the center of the hover event and the center of the touch event.

11. The method according to claim 10, wherein the touch event is verified as an intended user interaction responsive to the distance being larger than a pre-defined shift threshold.

12. The method according to claim 1, wherein the touch event is rejected as an intended user interaction responsive to the touch event spanning an area above a pre-defined threshold.

13. The method according to claim 12, wherein verifying or rejecting the touch event based on the spatial relationship determined is performed responsive to the touch event spanning an area below the pre-defined threshold.

14. The method according to claim 1, wherein the hover event is a precursor to the touch event.

15. The method according to claim 1, wherein the touch event and the hover event are detected substantially simultaneously.

16. The method according to claim 1 wherein the touch event that is the intended user interaction is finger touch.

17. The method according to claim 1 wherein the touch event that is rejected as the intended user interaction is palm touch.

18. A system comprising:
a digitizer sensor configured to detect touch input and hover input;
a controller configured to determine spatial characteristic of a touch event and a spatial characteristic of a hover event and to verify the touch event as an intended user interaction or reject the touch event as an intended user interaction based on the spatial characteristics determined for both the touch event and the hover event,
wherein the controller is operated to determine an area on the digitizer sensor spanned by the hover event; determine location on the digitizer sensor of the hover event in relation to location on the digitizer sensor of the touch event; and verify the touch event as the intended user interaction responsive to both the area spanned by the hover event and the location of the hover event in relation to the location of the touch event.

19. The system according to claim 18, wherein the digitizer sensor is configured to detect touch input and hover input from one or more fingers.

20. A device comprising:
a display;
a digitizer sensor proximate to the display, wherein the digitizer sensor is configured to detect touch input and hover input;
a controller in communication with the digitizer sensor; and
a circuit operated to determine a spatial characteristic of a touch event and a spatial characteristic of a hover event, both the touch event and the hover event detected with the digitizer sensor and to verify the touch event as an intended user interaction or reject the touch event as an intended user interaction based on the spatial characteristics determined for both the touch event and the hover event,
wherein the circuit is operated to determine an area on the digitizer sensor spanned by the hover event; determine location on the digitizer sensor of the hover event in relation to location on the digitizer sensor of the touch event; and verify the touch event as an intended user interaction responsive to both the area spanned by the hover event and the location of the hover event in relation to the location of the touch event.

21. The system according to claim 18, wherein the digitizer sensor is operated to detect touch and hover of one or more fingers.

* * * * *